US012579553B2

(12) United States Patent
Iyer et al.

(10) Patent No.: US 12,579,553 B2
(45) Date of Patent: Mar. 17, 2026

(54) REUSABLE DATA SCIENCE MODEL ARCHITECTURES FOR RETAIL MERCHANDISING

(71) Applicant: Target Brands, Inc., Minneapolis, MN (US)

(72) Inventors: Subramanian Iyer, Sunnyvale, CA (US); Abhijith Neerkaje, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 14 days.

(21) Appl. No.: 18/086,188

(22) Filed: Dec. 21, 2022

(65) Prior Publication Data
US 2023/0196391 A1 Jun. 22, 2023

Related U.S. Application Data

(60) Provisional application No. 63/292,301, filed on Dec. 21, 2021.

(51) Int. Cl.
G06Q 30/0202 (2023.01)
G06Q 10/04 (2023.01)

(52) U.S. Cl.
CPC ......... G06Q 30/0202 (2013.01); G06Q 10/04 (2013.01)

(58) Field of Classification Search
CPC ........................... G06Q 30/0202; G06Q 10/04
See application file for complete search history.

(56) References Cited

U.S. PATENT DOCUMENTS

| | | | | |
|---|---|---|---|---|
| 7,346,597 B2 * | 3/2008 | Dumas | .................... | G06Q 10/02 |
| | | | | 706/45 |
| 8,676,629 B2 * | 3/2014 | Chien | .................... | G06Q 30/02 |
| | | | | 705/7.29 |
| 10,878,505 B1 * | 12/2020 | Blair | ...................... | G06V 10/82 |
| 11,134,094 B2 | 9/2021 | Merza et al. | | |
| 11,182,808 B2 | 11/2021 | Ohana et al. | | |
| 11,340,941 B2 | 5/2022 | Ahnn et al. | | |
| 11,443,237 B1 * | 9/2022 | Song | ...................... | G06F 16/338 |
| 2007/0129992 A1 * | 6/2007 | Kasper | .................... | G06Q 10/06 |
| | | | | 705/7.31 |
| 2009/0024407 A1 * | 1/2009 | Shan | ................... | G06Q 30/0202 |
| | | | | 705/348 |

(Continued)

FOREIGN PATENT DOCUMENTS

| | | | | |
|---|---|---|---|---|
| CA | 3034417 A1 * | 12/2019 | ........... | G06Q 10/087 |

OTHER PUBLICATIONS

Mitra et al. "A Comparative Study of Demand Forecasting Models for a Multi-Channel Retail Company: A Novel Hybrid Machine Learning Approach" (2022) (https://link.springer.com/article/10.1007/s43069-022-00166-4) (Year: 2022).*

*Primary Examiner* — Sujay Koneru
(74) *Attorney, Agent, or Firm* — Merchant and Gould, P.C.

(57) ABSTRACT
A model development and maintenance architecture is provided, alongside a generalized model architecture for creation and execution that improves accessibility, reusability, and uniformity across a large organization, such as a large retail organization. In particular, the model architecture allows for creation, maintenance, and use of highly granular and top-level models without sacrificing accuracy.

20 Claims, 17 Drawing Sheets

(56)          References Cited

U.S. PATENT DOCUMENTS

| 2012/0209783 | A1* | 8/2012 | Smith, Jr. | ............ | G06Q 20/384 |
| | | | | | 705/308 |
| 2015/0347942 | A1* | 12/2015 | Adhikari | ......... | G06Q 10/06315 |
| | | | | | 705/7.22 |
| 2017/0091673 | A1* | 3/2017 | Gupta | ................... | G06N 5/022 |
| 2017/0154349 | A1* | 6/2017 | Popescu | ............ | G06Q 30/0211 |
| 2018/0308039 | A1* | 10/2018 | Nemati | ............. | G06Q 30/0202 |
| 2018/0315059 | A1 | 11/2018 | Venkatesh et al. | | |
| 2019/0095785 | A1* | 3/2019 | Sarkar | ................... | G06N 20/00 |
| 2019/0130425 | A1* | 5/2019 | Lei | .................... | G06Q 30/0201 |
| 2020/0074402 | A1* | 3/2020 | Adato | ................... | G06V 20/52 |
| 2020/0097878 | A1* | 3/2020 | Graham | ......... | G06Q 10/063116 |
| 2021/0042633 | A1* | 2/2021 | Maucec | ............... | G06F 16/355 |
| 2021/0089512 | A1* | 3/2021 | Fuchs | .............. | G06F 16/24568 |
| 2021/0312488 | A1* | 10/2021 | Wick | ................ | G06Q 30/0206 |
| 2022/0358436 | A1* | 11/2022 | Vakhutinsky | ...... | G06Q 10/0637 |
| 2022/0405775 | A1* | 12/2022 | Siebel | ................ | G06Q 30/0201 |
| 2024/0199552 | A1 | 6/2024 | Zhang et al. | | |

\* cited by examiner

100

Requirements Gathering 102

Data ETL 104

Model Development 106

Model Deployment 108

Implementation and Business Execution 110

| new_clusters | size | size_line_item_group | Sales_Mean | Unit_Mean | Elasticity_Mean | Repeat_Guest_Mean | sts_perc_kmeans |
|---|---|---|---|---|---|---|---|
| SKVI | 706 | 91 | 3,100,932.03 | 19,311,789.96 | -0.88 | 0.07 | 0.26 |
| KVI | 454 | 243 | 794,794.53 | 3,767,023.92 | -1.53 | 0.04 | 0.13 |
| FG | 1123 | 700 | 318,789.23 | 2,346,118.48 | -0.10 | 0.08 | 0.18 |
| BG | 2921 | 2697 | 151,532.29 | 967,461.85 | -0.07 | 0.03 | 0.44 |

REUSABLE DATA SCIENCE MODEL ARCHITECTURES FOR RETAIL MERCHANDISING

CROSS-REFERENCE TO RELATED APPLICATIONS

The present application claims priority from U.S. Provisional Patent Application No. 63/292,301, filed on Dec. 21, 2021, the disclosure of which is hereby incorporated by reference in its entirety.

BACKGROUND

Decision models used in retail sales may take a wide variety of forms to meet the particular needs of particular applications. Generally, an approach for developing such decision models involves: gathering requirements for the decision model; collecting and organizing data necessary to execute decision-making processes; building and iteratively improving a model, such as an artificial intelligence model used for decision-making; deploying the model as an application; and testing the outcomes driven by the model, leading to iterative improvement.

Historically, because many of these steps are specific to the problem at hand, many steps are performed on a custom basis for each decision model that is developed. For example, in the context of a data science model (e.g., a machine learning or artificial intelligence model), a requirements gathering process is performed where a data scientist may attempt to understand a business process and decisions from a stakeholder. The various trade-offs and key decisions made by the stakeholder are then captured in a logical "language", such that the data scientist can then begin to explore data by segmenting the data and visualizing the data to understand various trends and relationships. A data science model may then be created, by transforming a raw data set into types of data that are appropriate for consumption by an intended model. This can include, for example, data normalization and scaling processes that are specific to the data intended to be ingested as well as the model intended to be used. Subsequently, the engineered data may be provided to a model that is created and trained to achieve a particular decision process, such as prediction, classification, optimization, or measurement/quantification of outcomes or relationships.

The selection of a particular model to be used may be influenced by, for example, business requirements, data sources that are available, the extent to which human intervention is possible, computational costs, and development efficiency.

In the retail merchandising context, there are a wide variety of decision processes for which decision models have been developed. For example, sales forecasts may have a particular model based on expected demand and item availability. However, clearance sales forecasts may have a different particular model based on a different pricing scheme, different goals, different expected demand, and differences in supply chain availability (e.g., such clearance items are not typically restocked once on a clearance program). Furthermore, digital demand forecasts may be different from in-store demand forecasts. Individual store forecasts may also be different from retail chain wide forecasts that involve a large number of stores, because of the high variability in sales at a single location but lower variability when aggregated over a large number of retail locations. Still further, the way in which individual effects may be applied within a model differ widely between various types of decision processes. For example, seasonality, promotions, and weather effects which may affect sales at individual locations greatly may have muted effects across an overall supply chain.

Because each model has an overall goal of improved decision-making, accuracy is paramount in developing each model. For this reason, current approaches involve bespoke design of each model, related engineered data, and associated infrastructure. However, this results in significant duplication of engineering and data science efforts, as well as duplication of data storage, repeated/similar model training efforts, and often leads to confusion as to which one or more models is most appropriately used for a given decision making process, and whether decisions driven by multiple models would even be compatible or consistent with each other.

SUMMARY

In general, a model development and maintenance architecture is provided, alongside a generalized model architecture for creation and execution that improves accessibility, reusability, and uniformity across a large organization, such as a large retail organization. In particular, the model architecture allows for creation, maintenance, and use of highly granular and top-level models without sacrificing accuracy.

In a first example aspect, a platform is described for creation, maintenance, and execution of machine learning models within a retail organization having a plurality of locations including retail locations and warehouse locations. The platform includes one or more computing systems each including one or more processors and a memory, the memory storing instructions that cause the one or more computing system to perform: hosting a plurality of interoperable machine learning demand forecasting model components including at least a base forecasting model component, an item lifecycle forecasting model component, an item similarity service, a store similarity service, and a demand transfer component, the plurality of interoperable machine learning demand forecasting model components being trained using a normalized dataset derived from a plurality of disparate data sources; creating a plurality of machine learning models from the machine learning demand forecasting model components, the plurality of machine learning models being useable for demand forecasting within a retail organization, the plurality of machine learning models each outputting a demand forecast at a different granularity and including at least a first forecasting model useable to forecast demand at a per-item, per-day, per location level within the retail organization and a second forecasting model useable to forecast demand at a department-week-store sales level; and scheduling execution of the plurality of machine learning models independently of each other within the platform within a plurality of distributed container-based executable modules.

In a second aspect, a method of managing a plurality of demand forecasting models within a retail enterprise is provided. The method includes ingesting and normalizing data from a plurality of disparate data sources including internal and external data sources, and hosting a plurality of interoperable machine learning demand forecasting model components including at least a base forecasting model component, an item lifecycle forecasting model component, an item similarity service, a store similarity service, and a demand transfer component, the plurality of interoperable machine learning demand forecasting model components being trained using the normalized data derived from the plurality of disparate data sources. The method also includes creating a plurality of machine learning models from the machine learning demand forecasting model components, the plurality of machine learning models being useable for demand forecasting within a retail organization, the plurality of machine learning models each outputting a demand forecast at a different granularity and including at least a first forecasting model useable to forecast demand at a per-item, per-day, per location level within the retail organization and a second forecasting model useable to forecast demand at a department-week-store sales level, and scheduling execution of the plurality of machine learning models independently of each other within the platform.

BRIEF DESCRIPTION OF THE DRAWINGS

FIG. 11 is a block diagram of an example elasticity model that may be used to implement the elasticity model of FIG. 10

FIG. 12 is a chart illustrating datasets useable in a downstream price insights model, including an output from the elasticity model of FIG. 10.

DETAILED DESCRIPTION

Figure 1:
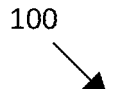
FIG. 1 illustrates a flowchart of model building, execution, and maintenance.
Figure 1:
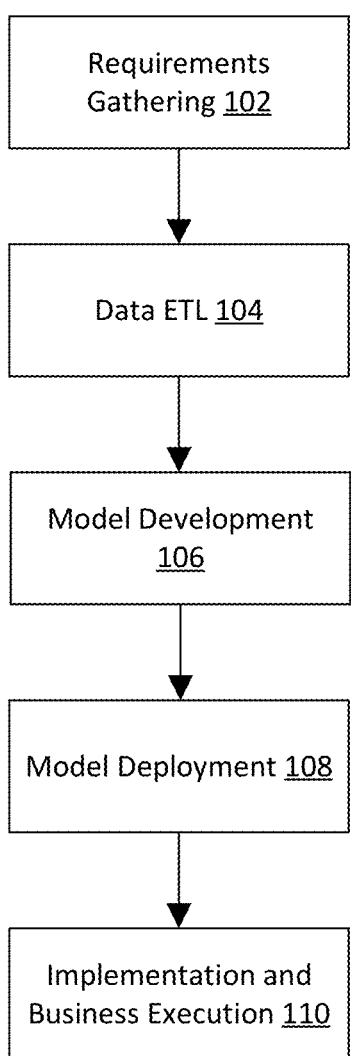

As briefly described above, embodiments of the present invention are directed to a system architecture for creation, management, and reuse of decision system components within a retail context.

As noted above, many different decision models are often generated for particular decisionmaking needs. Within the merchandising context, based on the specific use case, forecasts may be needed at different granularity (spatial, temporal or within a particular merchandise hierarchy), time horizon, metric (e.g., per dollar, unit, person), and for specific sales channels (e.g., in-store sales, digital sales from specific stores, or digital sales shipped to home from a store or distribution center). Existing approaches to the challenge associated with consolidation of data science models involve developing a unified model that has flexibility to scale up and down a large retail enterprise. However, those approaches are largely unworkable due to the wide variety of business needs for the various models, whether those be (1) a need for very recent (near realtime) data, (2) incorporation of large training datasets, (3) inaccuracy of such a model at either high or low granularity, or both, due to tradeoffs in modeling between the two.

In accordance with the present disclosure, a model development and maintenance architecture is provided that improves decision model discoverability, trust, readiness, interface design, and model design, to reduce the difficulty in design of individual models, and also improve the interoperability of multiple models within an overall retail decisioning architecture. Rather than developing a single demand signal, multiple, compatible sub-models may be created in a flexible manner by using a standardized model building approach. Such models, which may be standardized on the types of data, training standards, and features or interfaces exposed, may be combined to build models to meet a variety of business needs across varying audiences and granularities in a large-scale retail organization.

By providing a standardized approach, aligned forecasts may be created, which allows for aligned decisionmaking processes across models. Additionally, any override operations taken by humans during operation of decisioning processes may be tracked across decision models, which might otherwise undermine statistical comparisons across models. Additionally, interrelated models that use similar model components may be easily synchronized by their use of inherently synchronized (i.e., re-used) model subcomponents. Further, improved development processes using an integrated decision model creation architecture provides greater efficiency and shorter development lifecycles.

It is recognized that, even using an integrated decision model creation architecture, different models will be needed for different use cases. However, there are repeating patterns and needs within a retail or merchandising context across models, such as forecast estimation, elasticity, and item similarity. In accordance with aspects of the present disclosure, an integrated decision model creation architecture provides a plurality of different decision models useable in merchandise forecasting. These general types of models include store replenishment decision models, which may include: (1) an item-week-location unit forecast, which may be used for a generalized model as well as a "fast seller" model, for weekly and daily forecasts; a clearance model for removal of retail inventory from stores; a price change model; a promotion model; (2) an item-week-distribution center unit forecast, useable for purchasing and/or labor planning; (2) an item-week-chain digital unit forecast, useable for inventory placement, store fulfillment, and flex fulfillment labor planning; (3) an all-item, any location-day unit forecast, useable for labor planning, trailer appointments, and capacity planning across various locations (stores and distribution centers), or (4) a department-week-store dollar sales forecast, useable for attribution of events to sales, long-range planning, and store labor planning decisions.

In example aspects, the integrated decision model creation architecture maintains a core set of models that are reusable across a wide variety of different decision processes, and which may be reused as part of downstream decision models. Accordingly, overall models may be constructed from model components. In example embodiments, the model components created as described herein are constructed in a hierarchical manner. That is, models designed to generate forecasts at a higher level of generality expose parameters that may be passed to more granular models. This allows such irregular models to inherit information from models at higher levels of generality and overlay customized modeling components to address such irregularities.

Additionally, to accommodate external factor modeling, additional reactive modeling techniques may be employed at higher levels of granularity. For example, a suddenly important topic of conversation raised during an evening television show (e.g. discussion of a particular book, or appliance) may result in a sudden sellout of that item the next business day. In a more granular model having enhanced reactivity, it is possible to ensure that stock is available the following day after the sellout.

In some instances, a reusable component-based architecture may be provided within the context of the model development and maintenance architecture that enables quick construction of models to define behavior associated with individual merchandising issues that arise in various portions of an organization. Such models may turn may be used in combination with each other to arrive at various aggregate models. As further discussed below, example models may include a disaggregation model that defines how demand may be apportioned at an appropriate level of granularity based in a predefined starting granularity. For example, such a disaggregation model may define ways in which demand may be disaggregated from an overall enterprise level to a region, or to an individual store, for an individual item. Further, a disaggregation model may disaggregate such demand differently to account for varying ways in which an enterprise supply chain may fulfill that demand (e.g., from a particular store, from a group of geographically-close stores, or across the entire supply chain.

In further instances, a reusable elasticity model architecture may be developed within the model development and maintenance architecture that may integrate with other components to apply merchandising elasticities in a modular manner to various demand models that are used by an enterprise. Still other modular components may be created to model, for example, seasonality (e.g., seasonal effects on various types of demand models) or other effects. In some instances, combinations of models directed to each such feature (e.g., disaggregation, elasticity, seasonality as examples, but including various other models) may be utilized to effectively model retail enterprise effects such as product demand.

I. Model Building and Maintenance within a Retail Enterprise

Referring first to FIG. 1, a flowchart of a generalized method 100 for model building, execution, and maintenance is shown. The method 100 may be performed, for example, within a retail enterprise such as seen in FIG. 2.

In the example shown, the method 100 includes a requirements gathering phase (step 102). The requirements gathering phase generally corresponds to a phase during which business process and decision-making requirements are gathered, translating those business requirements into a logical language. In a data exploration phase (step 104) a data scientist will explore the overall data available for analysis, and perform one or more extract, transfer, and load operations on that data to stage the data for further model development. Once the data is staged for use, the data scientist may perform model development (step 106), in which one or more data science models may be created, evaluated, and selected based on initial test results. Once the data scientist is satisfied with the model as developed, a deployment (step 108) may include exposing the model within a broader enterprise context for use. Model deployment may include, for example, selecting appropriate execution resources and establishing versioning, monitoring, and retraining processes as needed. A model implementation and business execution phase (step 110) allows third parties to view, select, and utilize the model as deployed to perform business processes. In this phase, feedback may be provided to the data scientist so that overall accuracy may be monitored and feedback provided to the extent retraining would be required for the model.

Figure 2:
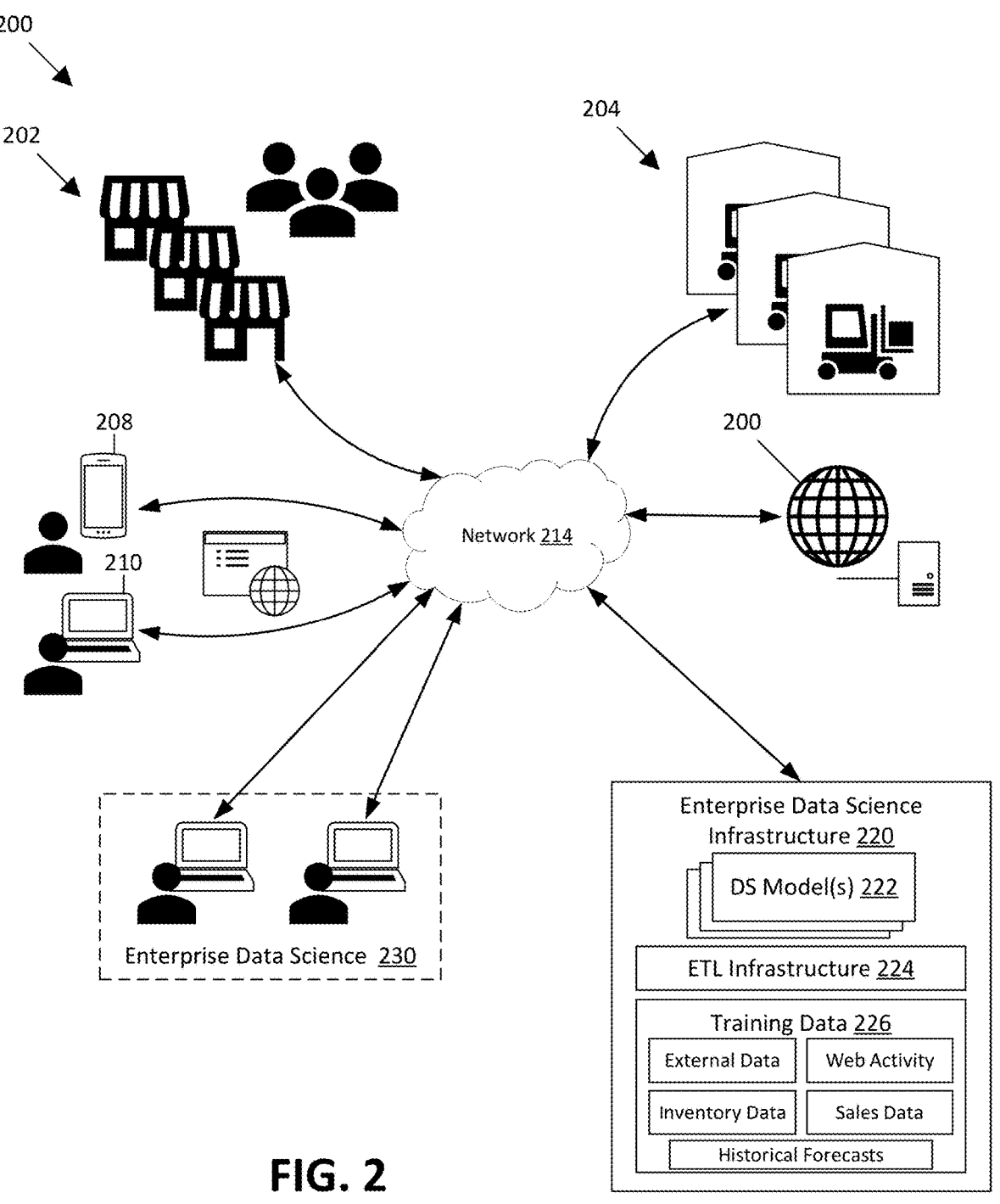
FIG. 2 illustrates an example retail enterprise network within which aspects of the enterprise data science infrastructure usable for maintaining reusable model architectures is shown.

FIG. 2 illustrates an example retail enterprise network 200 within which aspects of the enterprise data science infrastructure usable for maintaining reusable model architectures is shown. The network 200 generally represents an enterprise network of a retail organization that may utilize a variety of data science models for forecasting and prediction of various business operations, including demand and inventory forecasting, among other aspects.

In the example shown, the retail enterprise network 200 includes a plurality of retail locations 202 (e.g., stores), as well as a plurality of distribution locations 204 (e.g., warehouses). Additionally, the retail enterprise network 200 may include a retail web server 206 that offers items for sale to users via a variety of computing devices 208, 210, e.g. via a retail website 212. The retail website 212 may be delivered via a browser, or in some instances via a mobile application.

In conjunction with business operations of such an enterprise, a variety of data is collected regarding those business operations, including inventory movement information and inventory level information at the retail locations 202 and distribution locations 204, as well as sales activity via both online and retail location channels, and web activity at the retail website 212. Any or all of this data may be collected centrally by the enterprise via a network 214 and used, in various contexts, as part of data science models implemented by the enterprise to predict future demand or inventory levels.

In the example shown an enterprise data science infrastructure 220 may include a plurality of data science models 222. The data science models may be generated from various reusable components, as described further below. An extract, transform, and load (ETL) infrastructure 224 may be used to ingest and transform the various data captured by the retail enterprise, and maintain that data on behalf of the enterprise data science of structure 220 as training data 226.

In the example illustrated, a plurality of enterprise data scientists 230 may utilize the enterprise data science infrastructure 200 create data science models 222. The enterprise data scientists 230 may perform a variety of data ingestion, analysis, transform, and modeling steps, as well as maintenance of such models to support business objectives of the enterprise.

Figure 3:
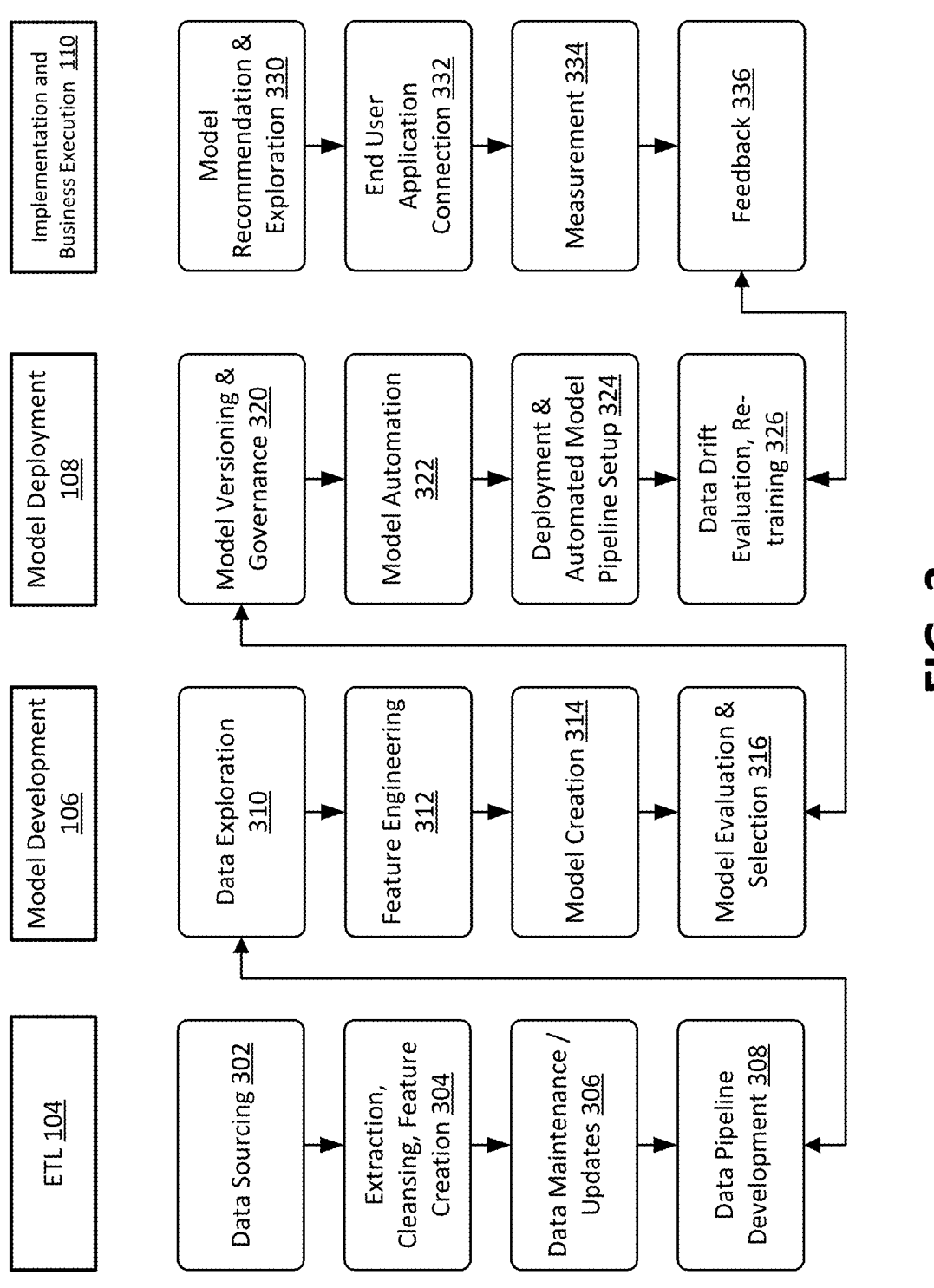
FIG. 3 is a logical flow chart of phases of model development, execution, and maintenance.

FIG. 3 is a logical flow chart of phases of model development, execution, and maintenance performed within an enterprise network, such as is seen in FIG. 2. Generally speaking, the phases correspond to the phases described above in conjunction with FIG. 1, including an extract, transform, and load (ETL) phase 104, a model development phase 106, a model deployment phase 108, and an implementation and business execution phase 110.

In the ETL phase 104, a data engineer will generally perform a data sourcing process 302, an extraction cleansing and feature creation process 304, a data maintenance process 306, and a data pipeline development process 308. The data sourcing process 302 corresponds to identifying sources of data within and external to the enterprise that may be used as part of the modeling process. Example data sources may include those described above, such as sales data, inventory data, web activity, and other internal data sources. Data sources may also include external data sources, such as weather activity, seasonal effects data, or other types of external effects on business operations. The extraction cleansing and feature creation process 304 defines a way in which the desired data is linked to or ingested, and the way in which particular features are created from that data. By features, it is intended that particular extrapolations of the data that may be of interest can be generated. Such extrapolations may be combinations of individual data fields, such as sales within a given period, sales within a given store for that period, or any of a variety of other types of extrapolations. In some instances, data may be normalized prior to analysis.

The data maintenance process 306 will generally include review and assessment of data obtained from data sources, for example to ensure the quality of data provided to data science models. In some examples, the data maintenance process 306 may include updating the amount or types of data received from a data source, or formats of that data.

The data pipeline development process 308 generally includes defining the way in which data may be delivered to a model development environment, for example for training of data science models in an efficient manner. This can include, for example, defining one or more APIs to receive data, scheduling internal jobs for moving data among internal databases, and a variety of other types of actions.

The model development phase 106 generally includes a data exploration process 310, a feature engineering process 312, a model creation process 314, and a model evaluation and selection process 316. The data exploration process 310 may be performed in conjunction with the data pipeline development process 308 described above. In particular, as a data scientists gathers requirements for a particular problem space, they may segment the data into various groups and run one or more statistical tracks on the data to determine data quality and completeness. In some instances, the data scientist will visualize the data to understand trends and relationships at an initial phase. The feature engineering process 312 generally corresponds to extrapolation of one or more features from underlying data, in preparation for inclusion of such features in a particular model. The model creation process 314 involves selecting an appropriate model or creating an appropriate data science model if no existing model is suitable, and providing the selected features to the model for purposes of training the model. In general, a model that is created during the model creation process 314 may take a variety of forms. For example, a prediction model, a classification model, and optimization model, or a measurement or quantification of outcomes or relationships may be performed by a given model. A model evaluation process 316 corresponds to assessing the trained model, and selecting a most appropriate trained model based on accuracy, execution speed, etc. This generally refers to a trade-off between model complexity and its ability to generalize a specific scenario (e.g. bias variance trade-offs).

The model deployment phase 106 generally includes a model versioning and governance process 320, a model automation process 322, a deployment process 324, and an evaluation process 326. The model versioning and governance process 320 generally refers to maintenance of one or more versions of the model, as revisions may occur during a model lifecycle. The model automation process 322 involves scheduling execution, and/or training cadence for a model to ensure appropriate results are generated by the model (e.g. up-to-date, but not over utilizing computer resources). The model deployment process 324 and evaluation process 326 are used for publishing the model to external users, and monitoring the model as time progresses because model is trained and tuned based on historical data may slowly degrade in performance as time progresses.

By using a coordinated model automation process 322, model deployment process 324, and evaluation process 326, a retail enterprise may coordinate the training, deployment, and modification of various models, to ensure that the models are synchronized in time and in use of coordinated data. While such models may be used by different business units within a retail enterprise, the synchronization of models may ensure synchronization of downstream retail decisions without requiring explicit synchronization between the business units that utilize the models.

The implementation and business execution phase 110 generally includes a model recommendation and exploration process 330, and end user application connection process 332, a measurement process 334, and a feedback process 336. The model recommendation and exploration process 330 exposes the data model to business users, alongside guidance regarding the manner in which the model should be used and the objectives of that model (including any shortcomings of the model). The end user application connection process 332 allows end users to connect to and explore data generated by the model. The measurement process 334 and feedback process 336 provide statistical feedback to the data scientist, so that they may assess when may be most appropriate time for evaluation and retraining (e.g. via the evaluation process 326 described above).

Figure 4:
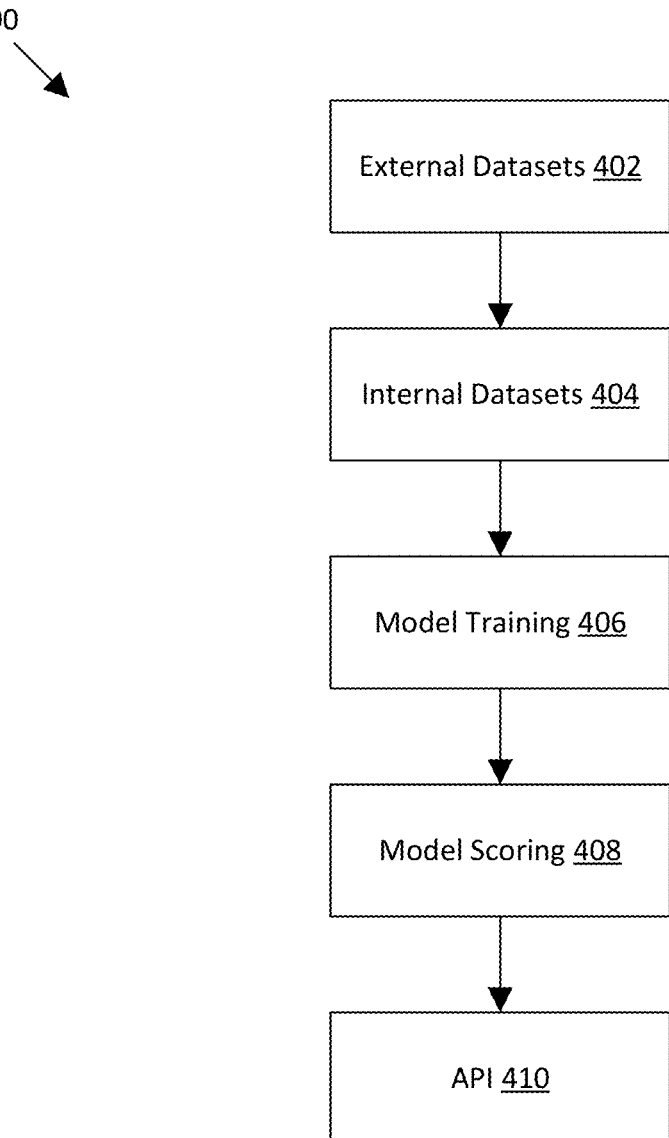
FIG. 4 is a logical flow chart of model development and maintenance within the enterprise retail environment, according to an example implementation.

FIG. 4 is a logical flow chart of a model development and maintenance process 400 within the enterprise retail environment, according to an example implementation. The model development and maintenance process of FIG. 4 is discussed in the context of demand forecast modeling that may be implemented by a retail enterprise.

Generally speaking, the overall process for model development and maintenance within an enterprise retail environment may be influenced by a variety of external factors. For example, the particular data sources available to a data scientist, business requirements of the retail enterprise, the extent to which human intervention or interaction with models is available, the need for consistency across various hierarchies within the organization, computational costs of underlying model development and execution, as well as development efficiency must be considered. Within a particular retail organization, business requirements may include flexibility to accommodate specific sales channels or delivery channels, and particular data sources may include availability of new data sources over time. Additionally, the architecture adopted should be only loosely coupled to particular modeling techniques, since modeling techniques may change over time. Regarding automation, it is often desirable to automate as much of a data science pipeline as possible; however, it may be beneficial to involve human interaction for strategic and long-range decision-making. In example implementations described below, automated systems are provided with thresholds and other protective measures for short-term tactical and operational decision-making, while longer-term decision-making involves human supervision of any model based decisioning. Still further, any model based decisioning is desired to provide outputs that are explainable, to enhance supervise ability of the underlying model.

Specifically in the context of a predictive or forecasting system, there may be a number of use cases that need to be accommodated during model development. For example, a store sales forecast may be desirable to be generated on a per item, units per day, per location basis over a particular time horizon (e.g., 8 to 16 weeks). Similarly, a digital, or online sales forecast may be desired which forecast sales on a per item, units per day basis but at the entire chain level, and over potentially a different time horizon (e.g., up to 52 weeks). Still further, for planning and budget purposes, a sales forecast may be desired in terms of dollars per week, at a per division/department/class level, for either stores or online sales, for a predetermined time horizon (e.g. up to 52 weeks).

At the same time, other models require significantly different analyses, because the time horizon or other constraints on such models would be significantly different. For example, in the context of clearance forecasts, a forecast may be desired to be generated on a per item, units per week basis for either an overall enterprise, or at the store level (e.g., based on whether the clearance forecast is a digital forecast or for an in-store clearance event). Such a clearance forecast may be for a time horizon significantly different from some other sales forecasts, since a clearance event would typically not require a full year of clearance events to reduce inventory. Similarly, for promotions, a promotion incrementality model may be desired that could forecast the extent of increased sales given a particular promotion. Such a promotion incrementality model might be constructed to project item sales on a units per week basis for a particular retail location, or a cluster of retail locations within a particular geographical or logical collection. Such a promotion incrementality model might be based on a still further time horizon, for example 12 weeks, and may be designed not only to determine overall sales, but a sales lift for the particular promotion in question. Still further, a top level sales prediction model may be used to determine, on a per department basis sales per week in terms of dollars, and may be determined on a per store or group of stores basis over the entirety of a year (e.g., 52 weeks). In this context, although near term, granular forecasts must be accurate, accuracy at the end of the time horizon is less important, as is accuracy at the individual store, item level. Challenges with such an approach, and explanations for why highly granular models are insufficiently accurate for such a forecasting system are described in U.S. Pat. No. 11,182,808, the disclosure of which is hereby incorporated by reference in its entirety. Finally, order forecasts may generate a per item forecasts on a units per hour basis. Such a forecast may be relevant to warehouses within a retail enterprise, and may be at the time horizon of one day or, in some instances, longer.

Overall, it can therefore be seen that various forecasts might be needed for purposes of forecasting within a retail organization, however those forecasts are very different in terms of their granularity (spatial, temporal, merchandise hierarchy), their time horizon (per hour, week, month, year, etc.), the metrics used (dollars, units, people) and the specific sales channels involved (in-store, localized to store, or digital ship to home). This almost be performed with adequate accuracy, and sufficient visibility toward each model, so that downstream users may be able to select an appropriate model for the particular application with which they are concerned. Still further, integration across all of these models avoids a lack of standardization and misaligned forecasts across models, inability to reconcile any human overrides that may occur, and other inefficient development processes involved in modeling enterprise forecasts.

In this overall context, the method 400 is performed by data scientists within a retail enterprise with the goal of capturing appropriate time, price, space, and external factors as influencing demand or sales performance across a variety of types of models that may be relevant to the organization. In particular, in the example shown, and integration of external data sets (at step 402) such integration may include connection to various external data sources, and integration (e.g. by an ETL process) of that data in a manner consistent with internal data records of the organization. For example, in the context of a large retail organization, external data sources may include weather data, emergency event data, health notice information, government regulations, current events, sporting events, or other external factors that may otherwise affect sales or demand forecasts in a particular location or across the organization. Each of these external data sources will often have its own data format and any data received may be required to be transformed prior to integration.

Similarly, integration of internal data sets (at step 404) may have similar challenges. For example, because sales data may be tracked in a different way than inventory data, which may in turn be tracked in a different way as compared to transportation for personnel information, or any internal constraints regarding space or price information, appropriate internal data sets are required to be formatted to a normalized format. Additionally, any missing values, outliers, or sparse data issues may be identified and addressed at this stage.

At the model training stage (at step 406), a particular model or models may be selected and trained appropriately using some of the data that is obtained in the overall architecture that will be described below. The model that is selected may be built from other partial models as further described below, and may be scheduled an automated in accordance with particular tools. For example, in the context of a demand forecasting model, a generalized additive model (GAM) may be selected and trained using internal and external data sources, as well as selected model parameters. A model scoring process (at step 408) assesses the accuracy and therefore value of the particular model, with iteration between training and scoring occurring to improve model accuracy. Upon arriving at a generally acceptable level of accuracy, the model may be exposed to an external audience, for example via an API (step 410).

Figure 5:
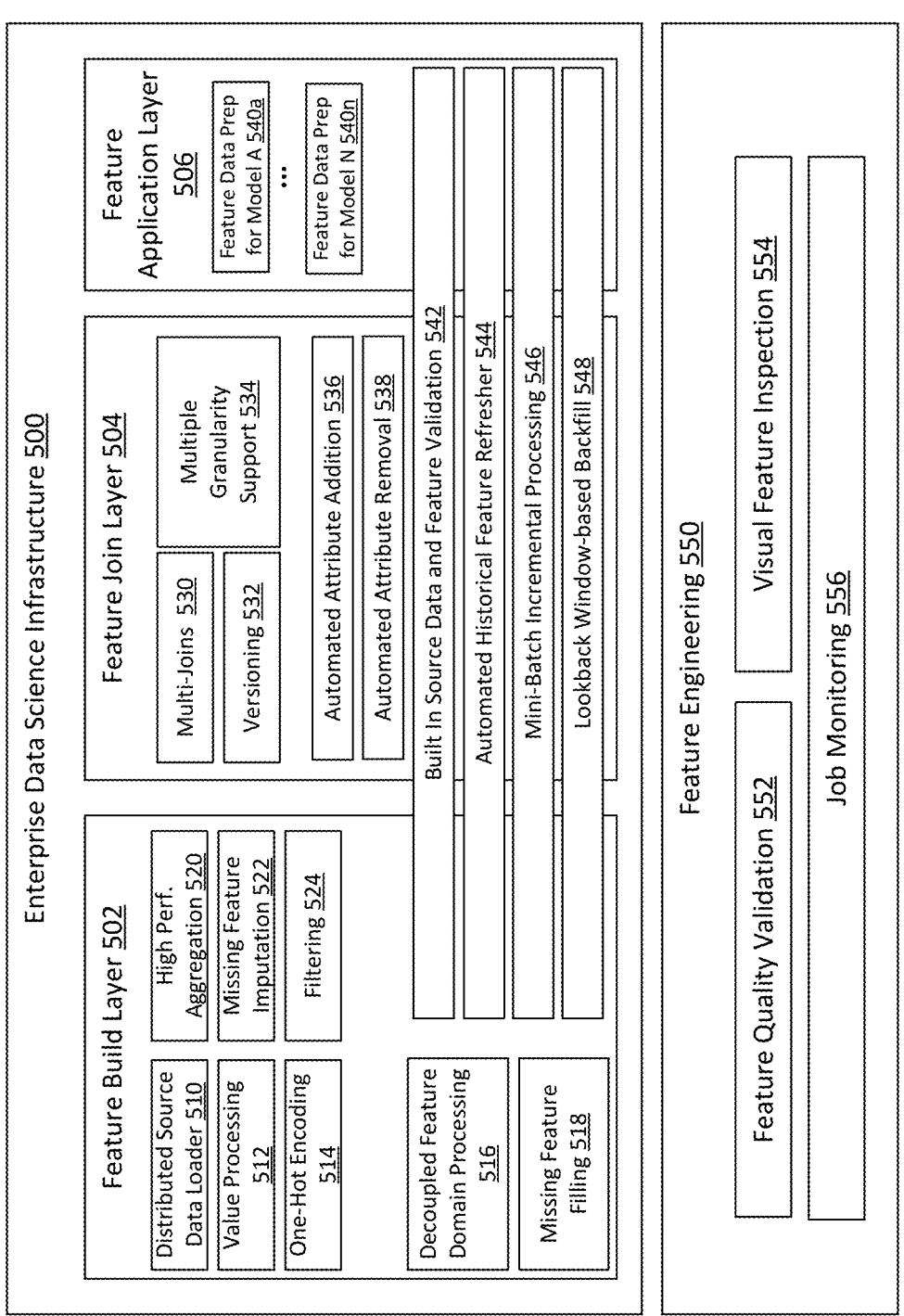
FIG. 5 is a block diagram of an enterprise data science infrastructure that maintains reusable model architectures, according to an example embodiment.

II. Model Development, Execution, and Maintenance Platform Components, and Use Thereof FIG. 5 is a block diagram of an enterprise data science platform that maintains reusable model architectures, according to an example embodiment. In the example shown, the enterprise data science infrastructure includes an enterprise data science infrastructure 500, as well as a feature engineering platform 550.

Generally speaking, the enterprise data science infrastructure 500 provides a set of tools in which a data scientist may perform the various model building and maintenance steps generally described above, in the context of a large retail enterprise. In the example shown, the enterprise data scientific structure 500 includes a feature build layer 502, a future joint layer 504, and a feature application layer 506.

The feature build layer 502 is generally constructed to build one or more features for use in a data science model. The feature build layer 502 may include a distributed source data loader 510, which may load data from internal and external sources. The build layer 502 may also include a value processing component 512 and a one hot encoding component 514. The value processing component 512 may analyze and modify data values in the received source data, for example to normalize and/or standardize data for use in model training. The one hot encoding component 514 may encode particular values in a one hot encoding, for example as may be used in some types of classification models.

The feature build layer 500 to further includes a decoupled feature domain processing component 516, as well as a missing feature filling component 518. The decoupled feature domain processing component 516 processes features in the future domain that is decoupled from the underlying data used to create those features. In doing so, some overhead associated with the underlying data manipulation may be avoided. The missing feature filling component 518 may, for features that are not fully described in our source data, fill in any missing features that may be required in a given data science model to allow for execution.

Still further, in the example shown, the feature build layer 502 includes a high-performance aggregation component 520, a missing feature imputation component 522, and a filtering component 524. The high performance aggregation component 520 is operable to aggregate a large data sets, for example for purposes of future creation. The missing feature imputation component 522 may, for any features that are missing, impute values for those features based on other observations within the underlying source data. A filtering component 524 filters extraneous data, for example tech stated with typographical errors or outliers in numerical values, etc.

The feature join layer 504 includes a multi-join component 530, a versioning component 532, and a multiple granularity support component 534. The multi join component 530 is operable to join two or more features for use in training models implemented within infrastructure 500. The versioning component 532 maintains versions of models that are created within the infrastructure 500. The multiple granularity support component 534 enables model usage at a variety of granularity's, including, for example, items per day per store, dollars per day per store, items per day across the overall organization, etc.

The feature join layer 504 further includes an automated attribute addition component 536 and an automated attribute removal component 538. These components allow for automated adjustments to data attributes used a given model based on, for example, changes in attribute collections of underlying data. Furthermore, the feature application layer 506 includes a plurality of feature data preparation subsystems 540a-n, for each of the models maintained by the enterprise data science infrastructure 500.

Across the feature build layer 502, feature drilling layer 504, and future application layer 506, a collection of tools are usable to maintain models over time. A source data and feature validation component 542 provides automated assessments of features and source data used in training data science models, for example to assess whether any anomalies exist in the data used to train data science models. Additionally, an automated historical feature refresher 544 can be constructed to automatically refresh features when new source data becomes available, e.g., upon receipt of new source data or on a predetermined schedule. A mini-batch incremental processing component 546 may be configured to re-train or re-execute portions of an overall model (e.g., sub-models that are included within a model) on a predetermined schedule, for example based on a rate of expected change of the model, a rate of change of underlying data, etc. The mini-batch incremental processing component 546 allows for partial retraining of models without requiring a full retraining to take place, which may take significant computing resources. Furthermore, a lookback window-based backfill component 548 operates to backfill missing data using past data in a predetermined or configurable-sized lookback window.

The feature engineering platform 550 includes, in the embodiment shown, a feature quality validation component 552, a visual feature inspection component 554, and a job monitoring component 556. In examples, the feature quality validation component 552 may include a tool that determines a quality of a data source and accordingly, any features generated therefrom. The visual feature inspection component 554 analyzes received data and automatically generates one or more statistics regarding that data to allow a data scientist to quickly view statistics about the quality of the data (e.g., completeness of records, etc.). An example of such a tool is described in U.S. patent application Ser. No. 18/410,006, entitled "Data Analysis Tool with Precalculated Metrics", the disclosure of which is hereby incorporated by reference in its entirety.

In examples, the job monitoring component 556 may be implemented as a runtime monitoring tool for monitoring multiple jobs running on heterogeneous job schedulers. In an example implementation, the job monitoring component 556 may be configured to crawl currently executing job status, and maintain a database of scheduled jobs in real time that may be viewed using a user interface component. An example of such a job monitoring component is described in U.S. patent application Ser. No. 16/741,548, entitled "Tool for Viewing Jobs Managed by Heterogeneous Job Schedulers", the disclosure of which is hereby incorporated by reference in its entirety.

Figure 6:
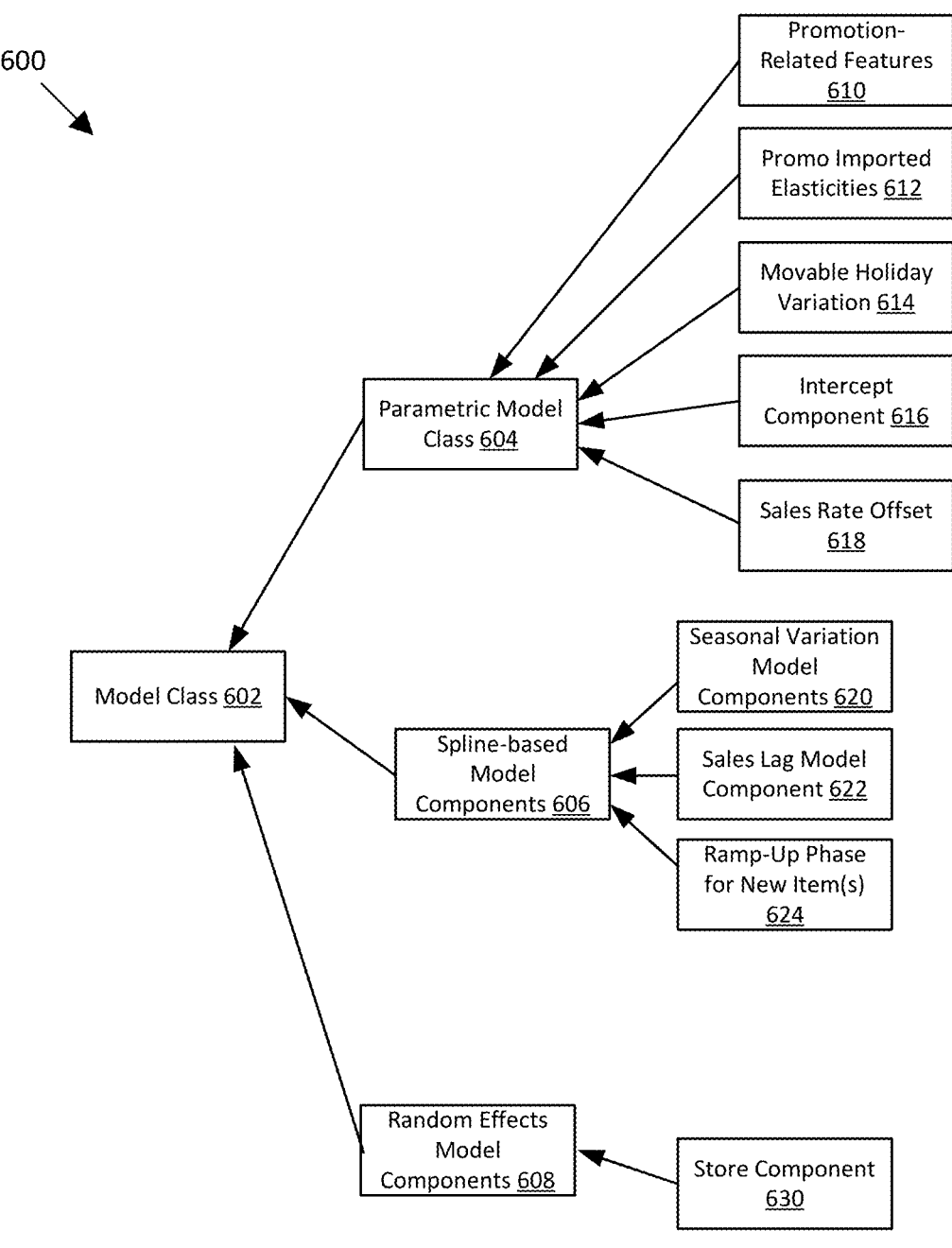
FIG. 6 is an example logical diagram of a modular data science model usable within a retail enterprise, according to an example embodiment.

FIG. 6 is an example logical diagram of a modular data science model 600 usable within a retail enterprise, according to an example embodiment. In the example shown, the model 600 is modular, in that a collection of classes of sub-models may be aggregated into an overall model. By aggregating different combinations of sub-models, and overall additive model (e.g., a generalized additive model) may be achieved.

In the example shown, an overall model class 602 is constructed, and includes sub models from a parametric model class 604, spline based model component 606, and random effects model components 608. In the example shown, the parametric model class 604 includes promotion related features 610, promotions with imported elasticities 612, variations due to movable holidays 614, a model component that provides a constant model intercept 616, and a sales rate offset for a given item 618. The spline based model component 606 includes, in the example shown, seasonal variation model component 620, sales leg model components 622 and a component that reflects a ramp up phase for a new item 624. The random effects model component 608 can include, in the example shown, a store component that provides a random intercept across all stores.

It is noted that these model components are exemplary, rather than limiting, as more or fewer components may be incorporated. Generally speaking, models or sub models may each be constructed from generalized additive models, neural network models, time series models, tree base models, for example. Generalized additive models will generally have high explainability and moderate accuracy, while being easily scalable and highly responsive to price and market mix. Additionally, generalized additive models are reasonably responsive in the situation of sparse data. Comparatively, neural network models generally have lower explainability with higher accuracy and more difficult scalability. Such models are highly responsive to price and market next and able to handle high data sparsity. Time series models generally have higher explainability but lower accuracy. Such models are easily scalable but have low responsiveness to price and market mix and are only moderately able to handle data sparsity. Still further tree based models generally have low explainability but high accuracy and easy scalability, with a high responsiveness to price and market mix and are easily able to handle data sparsity.

Notably, referring to FIG. 6 generally, although GAM models are generally known in the art, such additive models are created for special purpose systems, rather than focusing on reuse of the submodels. That is, in the present application, the submodels described herein are designed to use common data formats, and data sources, as well as being normalized in a similar manner, such that the submodels may be aggregated in different ways with reliable end result. Additionally, as noted above, the submodels are inherently synchronized so their end-users may inherently make time-synchronized business decisions without requiring significant end-user efforts.

Figure 7:
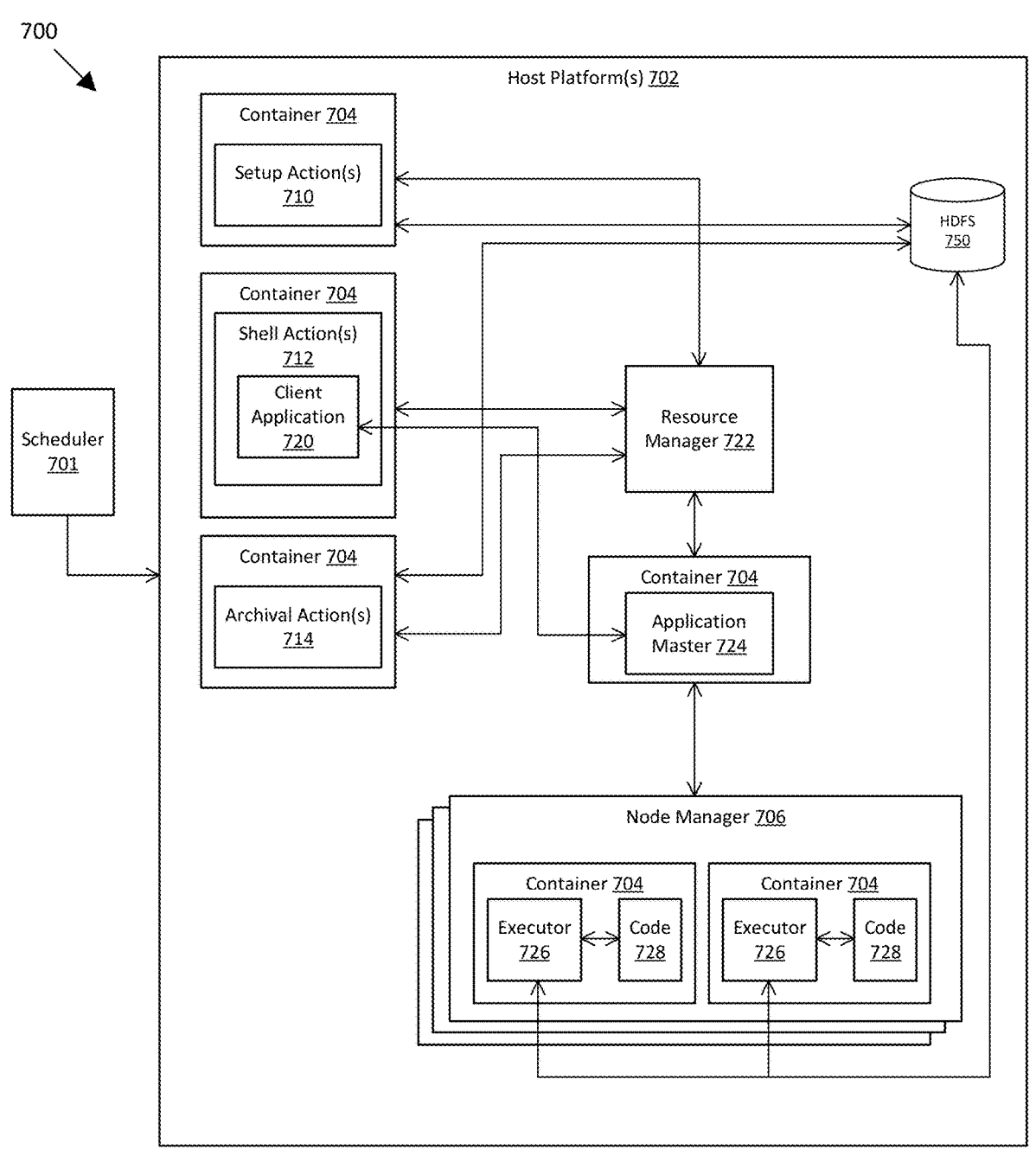
FIG. 7 is a block diagram of an example execution environment usable within the retail enterprise.

FIG. 7 is a block diagram of an example execution environment 700 usable within the retail enterprise. The example execution environment 700 generally reflects an example forecasting system architecture usable within a retail enterprise, for example to implement and execute the models such as the model 600 which is developed within the infrastructure framework 500 described above.

In the example shown, a scheduler 701 initiates execution of model code at a host platform 702. The host platform 702 hosts a plurality of containers 704. In the example shown, the container 704 may host, for example, set up actions 710, shell actions 712, and archival actions 714. The set up action 710 may include actions such as creating logs within a database 754 tracking the outcome of execution, as well as initiating communication with a resource manager 722 to allocate appropriate resources for executing an application. For example, set of actions may include allocating a predetermined number of nodes and/or containers at the host platform 702 for execution of a particular model.

The shell actions 712 can include hosting and executing client application 720. The client application 720 may be distributed to an application master 724 within another container 704 managed by the resource manager 722, which in turn communicates with a plurality of other nodes 706, each of which hosts one or more containers 704. Each of the containers 704 contains an executor 726 and code 728. The code 728 may be executed by executor 726, with results passed to the database 750. Accordingly, using application master 724 and code 728 across a plurality of nodes 706 and containers 704, execution of model code may be distributed across a number of computing nodes within an overall platform architecture.

In example embodiments, the execution environment 700 may be used to coordinate training, deployment, and execution of models in a coordinated manner, to allow for different models to be made available with coordinated data to different business units within the enterprise. Additionally, the variety of models may be distributed for execution across a wide variety of nodes 706 using containers 704, thereby improving overall execution by more efficiently distributing code to be executed to available computing systems.

Figures 8, 9:
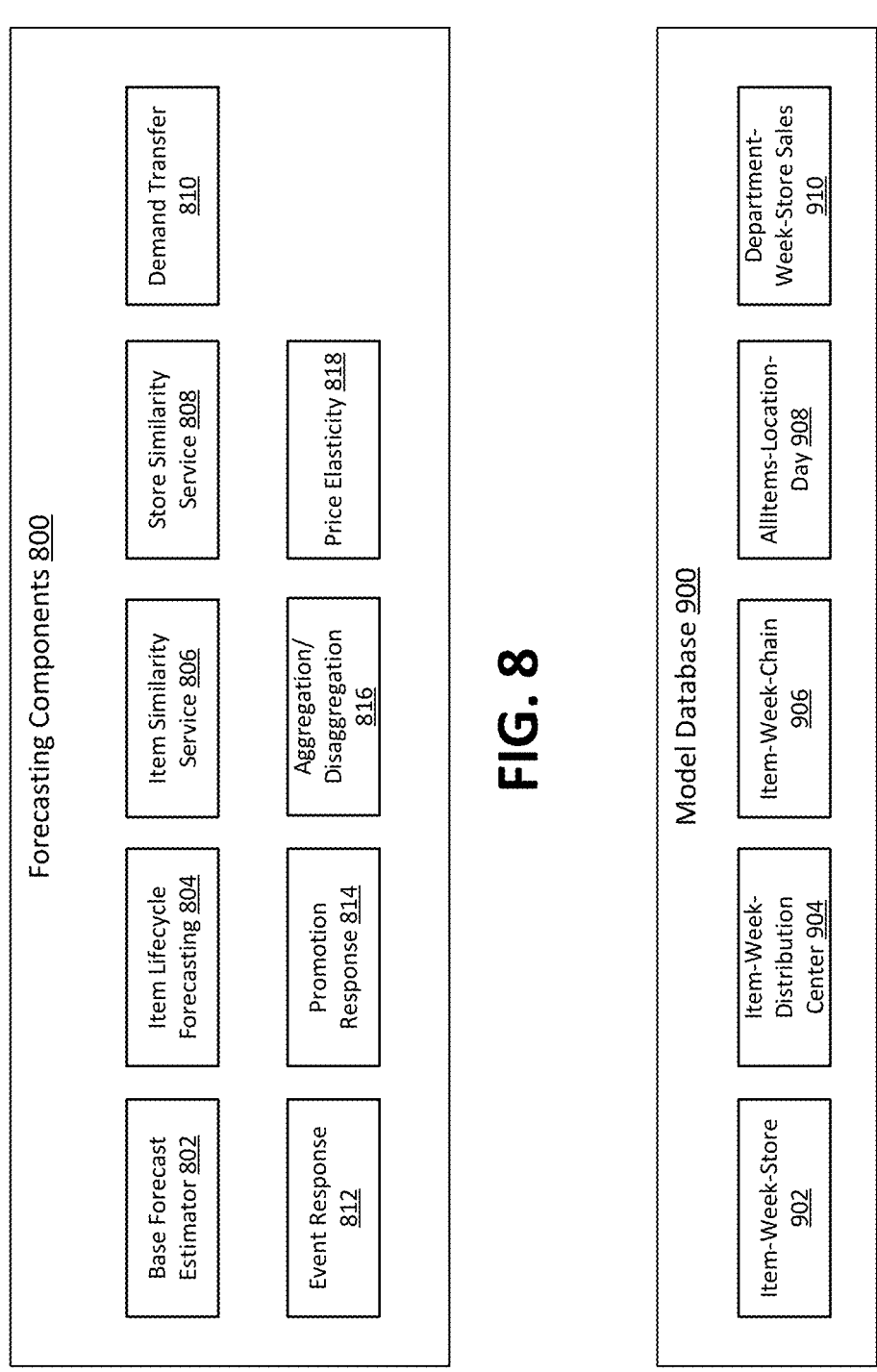
FIG. 8 is a logical diagram of forecasting components usable to create one or more different types of data science models within a retail enterprise, according to an example embodiment.
FIG. 9 is a logical diagram of an example model database maintaining a core set of models created using the forecasting components of FIG. 8.

Referring to FIG. 8 a logical diagram of forecasting components 800 usable to create one or more different types of data science models within a retail enterprise are shown, according to an example embodiment. Generally speaking, different models are needed for different use cases. As noted above, and overall forecasting model providing top down sales forecasts may be very different from a demand model for a particular item at a particular store, and the two models may be highly inaccurate with respect to the specific metric sought by the other model. However, there are repeating needs across models. In the example shown, a plurality of common components are shown, including a base forecast estimator 802, and item lifecycle forecast 804, and item similarity service 806, a store similarity service 808, a demand transfer component 810, an event response component 812, a promotion response component 814, an aggregation or disaggregation component 816, and a price elasticity component 818.

The base forecast estimator 802 may generate a base forecast for sales of a given item, at a particular location or group of locations. In example embodiments, the base forecast estimator 802 may be implemented as a moving average model with a decay component over time. The base forecast estimator 802 provides base trends for an item on merchandise hierarchy. Subject-based forecasts may be provided at different levels of hierarchy (e.g., at a store level, and item level, or at a region or chain level and as an item, class, or department level). Accordingly, regardless of the type of and model to be constructed, such a case forecasting may be used as a starting point, which promotes reuse of base forecasting settings and assumptions.

The item lifecycle forecast 804 may be used to apply specific item lifecycle effects to adjust the base forecast. For example, particular items may have seasonal sales cycles, lifespans (particular fad toys, fashion items, etc.), or may be more durable (e.g. standard grocery items). The item lifecycle forecast 804 applies decay factors for standard item lifecycle events, such as lockdown events or ramp for new items. For example, an item may have sales which decay over time in a predictable manner depending on the item type, class, etc. The item lifecycle forecasting service may generate coefficients that define a decay rate for a given item.

The item similarity service 806 models item characteristics so that a degree of similarity between two items may be determined. The similarity between two items may be used, for example, in instances where sparse data exists for a particular item (e.g. a new item) to allow for modeling of one item based on sales or demand behavior of the other item. The item similarity service 806 can receive an identification of an item more item characteristics, and provide a proxy item for identified items. This may, for example, be used in providing a proxy item within an existing collection for a new item to be introduced within an overall item collection, or at a particular store.

The store similarity service 808 models similarity in sales behavior between two or more stores within a group of stores in an enterprise. For example, the store similarity service 808 may model and group two or more stores as similarly acting where those stores may be positioned similarly (e.g. stocking similar items seasonally due to their geographic location, stocking similar items and having similar sales due to their location within a city or near a college, etc.). The store similarity service 808, as with the item similarities surface 806, generates an identification of a store or stores based on characteristics of a new store. This may be used, for example, to predict demand at a new store location.

The demand transfer component 810 models the transferability of demand between two items within a collection of items. Specifically, a demand transfer model managed by the demand transfer component 810 defines the manner in which items demand may carryover between two or more items. For example, where one particular item may be unavailable to a user, the demand transfer model determines the likelihood that a user would select another item, and defines the item that is likely to be selected. Additionally, aspects of demand that are applicable across multiple items in a category may be determined using such a model (e.g., a generalized demand for a type of item within an item collection). The demand transfer component 810 may be used, for example, as a component of various data science models that are used to develop an item collection, for example in planning for online or in-store item collections at particular locations given a limited space or limited number of SKUs that can be stocked. An example model usable as a demand transfer component 810 is described in U.S. patent application Ser. No. 15/582,244, entitled "Method and System of Managing Item Assortment Based on Demand Transfer", the disclosure of which is hereby incorporated by reference in its entirety.

The event response component 812 provides additive effects for particular events that may occur during the course of the year, either across the retail enterprise or at particular locations. In particular, an event response model maintained by the event response component 812 defines one or more coefficients for how demand may change in response to a given particularized event. Such an event may occur, either across an overall retail organization, or locally at a particular retail location. For example, a professional football game or college football game within a particular distance from a store, or a national championship game as affecting sales across all stores, could indicate a modification of demand of particular items (e.g., snack foods, apparel, etc.). Additionally, local fairs may affect sales at an individual retail location, while broader events such as weather disasters (e.g., hurricanes) may cause spikes in demand for emergency supplies. Other types of "black swan" events, such as COVID-19 or the like, could also be modeled for the way in which demand for particular items may be affected.

The promotion response component 814 models and overall sales lift due to a promotion that may be in place during a predetermined period of time. In some examples, for promotions that remain in place during a prolonged timeline, the model may include feedback and modification based on observed changes in sales lift. A promotion response model maintained by the promotion response component 814 defines additional coefficient modifications to overall forecasts that may occur based on planned promotions. Promotions may include, for example, prominent advertising placements, sale pricing, prominent item display, and the like.

The aggregation or disaggregation component 816 maintains hierarchical coherence across models along a number of different dimensions. The aggregation or disaggregation component 816 provides an overall hierarchy of items and locations, for example to allow forecasts to scale up along selected dimensions. For example, overall forecast demand for a particular item may be aggregated from multiple individual retail locations to a region or to an overall chain level. Additionally, overall forecast demand for a particular items may be aggregated within an item class or subclass for that individual location, or across multiple locations.

The price elasticity component 818 captures price elasticity of demand. The price elasticity component 818 provides additional coefficients that may be applied to a forecast which are impacted by price. For example, such additional elasticity coefficients may be used to define the way in which demand for an item may vary based on changes in price. In example embodiments, the price elasticity component 818 may be implemented as a log-log regression model, and given a markdown price, regular price and baseline demand, the component 818 may forecast unconstrained demand on the item. Such a price elasticity component 818 may be used, for example, in pricing models, such as clearance models.

Overall, the components 800 described herein may be used to construct an overall model hierarchically, with higher level models passing parameters to lower level models, such that lower level models may inherit information from the higher level models. For example, to the extent external factors are modeled, those exterior factors should disaggregate down to a store or item level either in a proactive or reactive manner. Additionally, because different models may utilize different ones of the components, the components are synchronized to ensure that model output is accurate. For example, a base forecast estimate is run on the same underlying data has particular event or promotion responses, or for which demand transfer is assessed. Accordingly, different business units (e.g., marketing, resource planning, finance, etc.) using different types of models at different levels of granularity will inherently use synchronized data and synchronized model behavior.

Now referring to FIG. 9, a logical diagram of an example model database 900 maintaining a core set of models created using the forecasting components of FIG. 8 is shown. The model database reflects a set of core models that may be maintained, for example as models 222 within the overall infrastructure. In the example shown, the set of models includes an item-week-store model 902, and item-week-distribution center model 904, and item-week-chain model 906, and all item-location-day model 908, and a department-week-store sales model 910.

In the example shown, the item-week-store model 902 may be used in a variety of contexts, such as or inclusion within store replenishment models, clearance models, price change models, or promotion models. Additionally, the item-week-distribution center model 904 may be usable within purchasing models and labor planning models at a distribution center. The item-week-chain model 906 may be usable for allocating demand at particular locations within a retail supply chain, or otherwise forecasting store fulfillment. Such a model may in particular be usable for labor planning at individual stores and distribution centers.

The all item-location-day model 908 may be usable as part of a labor planning model, or planning for inventory loads to be moved between nodes in a retail supply chain. Additionally, the all item-location-day model 908 may be used for capacity planning purposes. The department-week-store sales model 910 is usable for longer range planning, or store labor planning, and is particularly useful in attribution of demand effects due to external events.

Generally speaking, the models included in the model database 900 may be used in combination with each other. Additionally, these core forecasts may be easily adjusted to a different level of hierarchy or metric, for example using the services described above in conjunction with FIG. 8. Additionally, as noted above, the core forecasts are generally synchronized, thereby allowing users to compare or analyze data across the models up and down a hierarchy.

Referring to FIGS. 8-9 generally, it is noted that the combination of model components and models may be used in a variety of applications, to generate models for a large number of specific forecasting problems within a retail enterprise. For example, while in typical circumstances the item-week-store model 902 is appropriate for demand forecasting, in some instances a replenishment model may require a more responsive model, such as an item-day-store model for fast selling items. Still further, and as briefly noted above, clearance items required their own model to be built, due to the specific pricing adjustments and lack of replenishment involved. Still further, modeling of price changes, and demand elasticity may require a unique combination of submodels.

Additionally, while the above principles are particularly important in the context of demand forecasting, such demand forecasts may be further applied in other contexts, such as for purchasing planning, labor planning at stores and or distribution centers, or placement of items within a retail supply chain for digital fulfillment. Still further, placement of inventory to fulfill demand may impart requirements as to transportation planning, such as trailer routes between stores and warehouses, as well as assessment of capacity constraints within stores and/or warehouses. Each of these additional considerations may be informed by models generated from the components described above, and within the framework of common data sources, common sub models, and disparate, yet consistent models generated within the retail organization.

III. Elasticity Model Components

Figure 10:
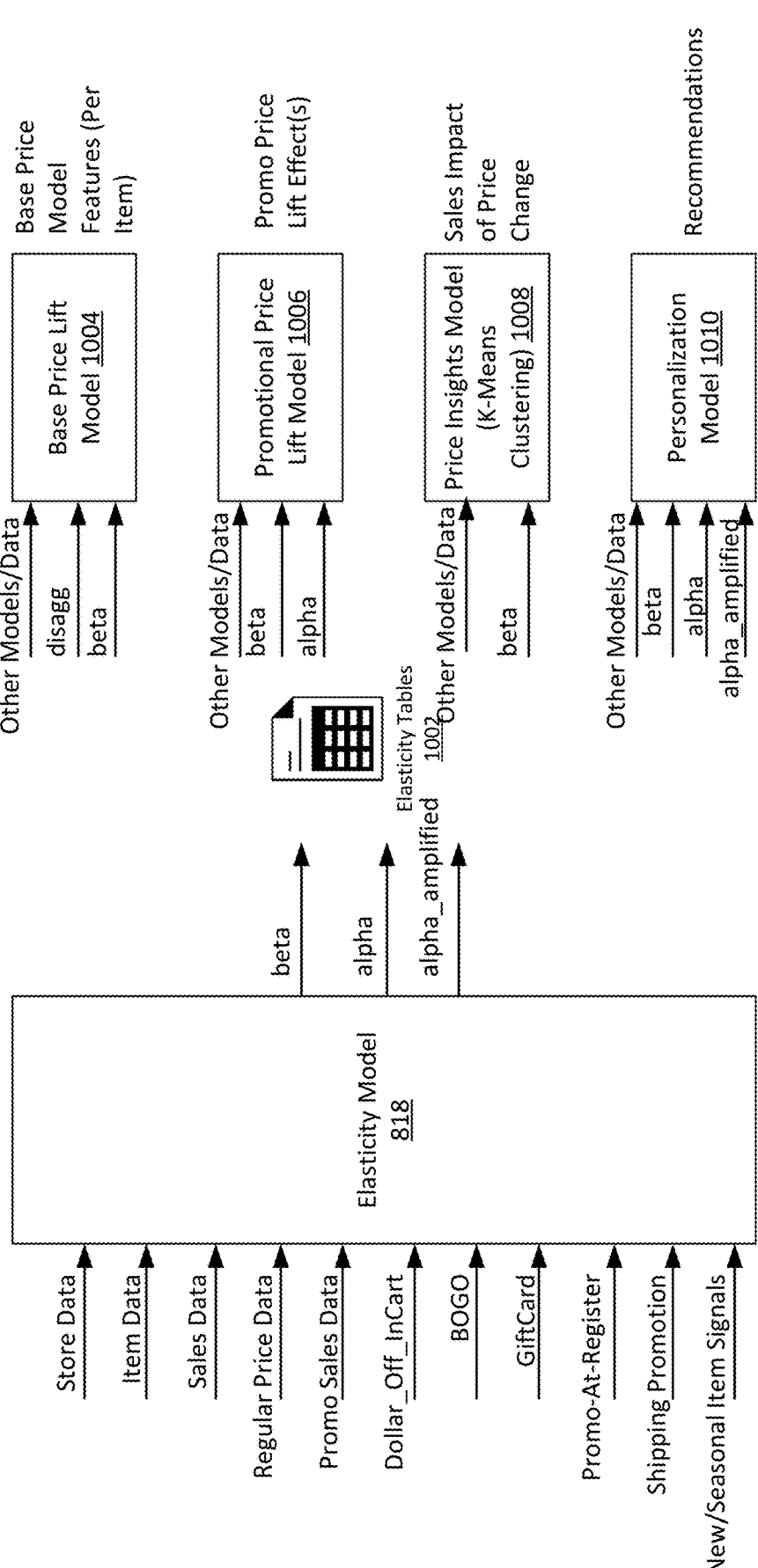
FIG. 10 is a block diagram of an elasticity model and related downstream models useable within the context of the enterprise data science infrastructure described herein.
Figure 11:
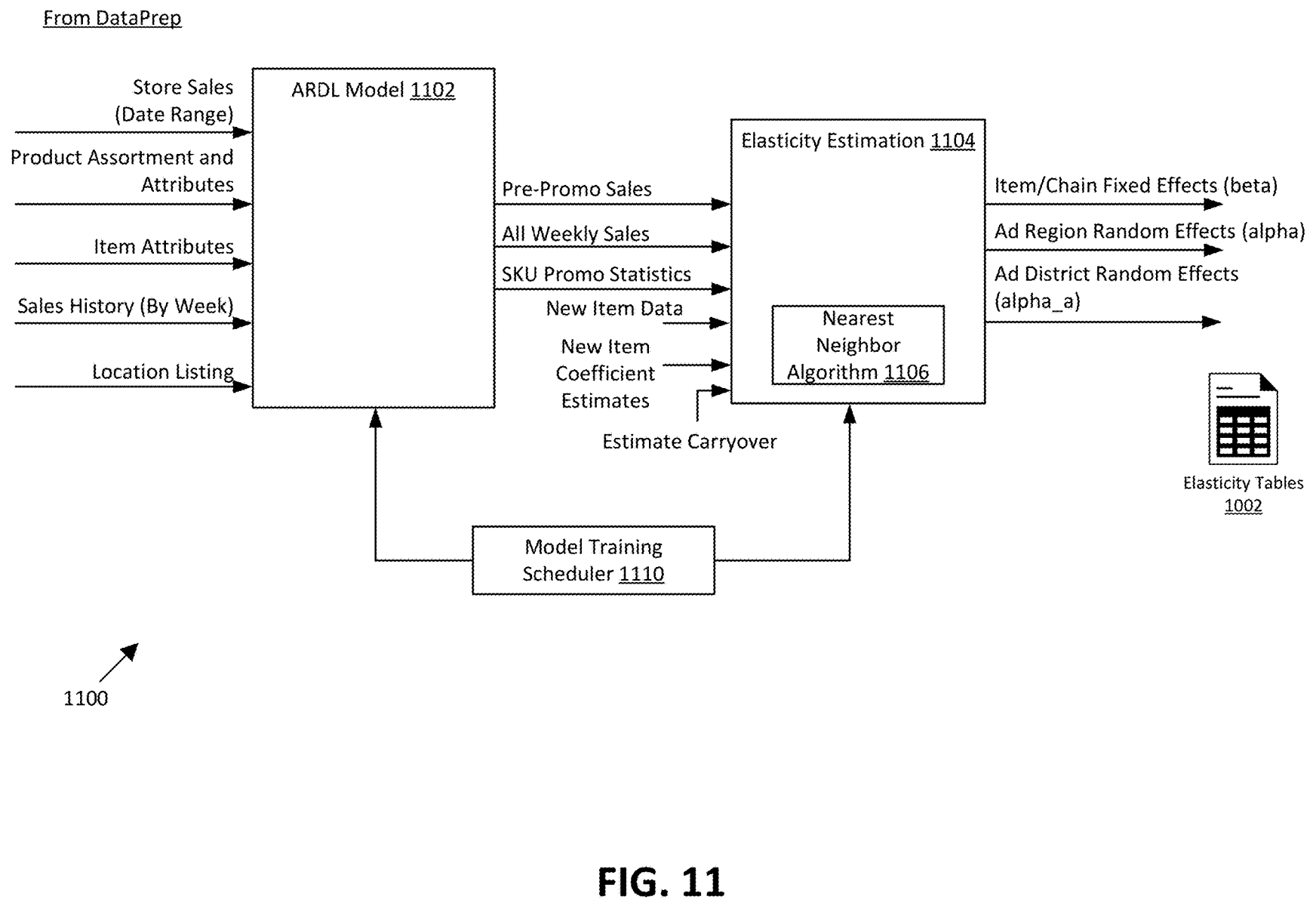

Referring now to FIGS. 10-12, a particular example implementation of the modular, reusable data science modeling within the context of a retail demand model is provided, in particular with respect to modeling of price elasticity.

As illustrated in FIG. 10, an elasticity model 818, as described above in conjunction with FIG. 8, may be created. Such an elasticity model 818 may have a plurality of inputs, such as store data, item data, sales data, regular price data, promotional sales data, a discount amount in court, a buy one get one free offer parameter, a gift card parameter a promotion at register parameter a shipping promotion parameter as well as new or seasonal item signals. The elasticity model 818 may, in general, have a plurality of outputs, including a beta output, and helpful output, and amplified alpha output. The outputs may be stored, for example, in an elasticity table 1002, which may be maintained, for example, in database 750 where the elasticity model 818 is maintained at host platforms 702 of an enterprise.

In the example shown, the beta output corresponds to elasticity associated with regular price changes in store. The alpha output corresponds to elasticity derived from on amplified sales prices associated with a particular item. The amplified alpha output corresponds to amplified sales prices, for example as may be encouraged by advertisement, such as a weekly ad or other communication. In general, the various outputs may be combined in different ways to derive an elasticity overall for a given item within a given hypothetical situation. Generally speaking, the model may determine from the item sales, prices, locations, and various promotions (e.g. the inputs described above) that particular items, such as snacks, are more elastic such that demand changes significantly with price change. The model may also determine that other items, such as medicine, may be more inelastic, such that price changes have less effect on demand.

The outputs from the elasticity model 818 may be distributed to a variety of downstream modeling components, thereby enabling such a modular architecture. For example, in the example shown, outputs stored to the elasticity table 1002 may be utilized, in combination with other signals, by a base price lift model 1004, a promotional price lift model 1006, a price insights model 1008, or a personalization model 1010. Other models may be used as well.

The base price lift model 1004, in the example shown, may receive various inputs from other models, as well as disaggregation information that may separate both demand signals and elasticity signals by location, combined with the beta output, to arrive at a set of base price model features on a per item basis. The base price model features may be usable to define an extent of, or effect of, base price lift at varying times steps into the future, for example 1-4 weeks into the future. Similarly, the promotional price lift model 1006 may receive the alpha and beta outputs, as well as outputs of other models and data, to generate a promotional price lift effect output. In examples, the base price lift model 1004 and promotional price lift model 1006 may be combined for example into an additive model for demand forecasting as described previously.

The price insights model 1008, in the example shown, may receive various external model or item information to generate price insights, for example a sales impact on particular price changes. In a particular example, the price insights model 1008 performs a cane means clustering process to group items into item segments, and aggregates particular data, such as sales data, repeat guest data, and elasticity information (e.g. the beta output) to generate outputs in response to "what if" scenarios used for demand planning and pricing decisions.

The personalization model 1010 may, in the example shown, receive data from various other models, as well as all the outputs of the elasticity model 818 to generate predictions as to individual items that may attract a specific customer. For example, a deal seeking customer may be more likely to identify and buy items having higher elasticity, and in particular higher elasticity associated with promotional effects (e.g. the amplified alpha output). Additionally, by using each of the beta, alpha, and amplified alpha outputs, it may be possible to isolate whether a customer seeking a deal may be more responsive to regular price combined with a promotion, or is more sensitive to the promotion only when combined with a price change.

Referring to FIG. 11 specifically, a particular example of an elasticity model 1100 is shown in an example embodiment. The elasticity model 1100 may represent one example implementation of elasticity model 818 described previously. In the example shown, the elasticity model 1100 includes an autoregressive distributed lag (ARDL) model 1102 as well as an elasticity estimation model 1104, including nearest neighbor calculation component 1106.

In the example shown, the ARDL model 1102 receives a plurality of inputs, including store sales within a particular date range, a product assortment and attributes, particular item attributes, a weekly sales history, and a location listing. The various inputs are received, in the example shown, from a data preparation stage within the enterprise infrastructure. Such a data preparation stage may be implemented, for example, using the enterprise data science infrastructure 500 described above in conjunction with FIG. 5, and the ARDL model 1102 and elasticity estimation model 1104 may be implemented within one or more containers on a host platform 702 seen in FIG. 7.

Generally speaking, the inputs received by the ARDL model 1102 may be aggregated from a location level to a particular district level or ad patch level for purposes of elasticity estimation. A district level is a particular grouping of retail locations within a geographic region. An ad patch level defines the region or location within which a particular promotion may be distributed to customers. As implemented, there may be multiple districts per ad patch.

In the example shown, the ARDL model 1102 may be implemented using a model of the following form:

$$\log(y_{i,j,t}) = \mu_{i,j} + s(t) + (1 + \gamma)\log(y_{i,j,t-1}) +$$
$$\alpha_{i,j}(\log(p_{i,j,t}) - \log(p_{i,j,t-1})) + \beta\log(p_{i,j,t-1}) + \epsilon_{i,j,t}$$

$$\mu_{i,j} = \mu + m_i + m_{i,j}$$

$$\alpha_{i,j} = \begin{cases} \alpha_0 + \alpha_{circ} + \alpha_i + \alpha_{i,j}, & \text{when } (i, j, t) \text{ is on circular} \\ \alpha_0 + \alpha_{tpc} + \alpha_i + \alpha_{i,j}, & \text{when } (i, j, t) \text{ is } tpc \\ \alpha_0 + \alpha_i + \alpha_{i,j}, & \text{for other price changes} \end{cases}$$

$$m_i \sim N(0, n_1^2), m_{i,j} \sim N(0, u_2^2), a_i \sim N(0, w_i^2),$$

$$a_{i,j} \sim N(0, w_2^2), \text{ and } e_{i,j,t} \sim N(0, \sigma^2)$$

In this implementation, $y_{i,j,t}$ is an average sales for an adpatch i, district j in week t. $\mu_{i,j}$ is a location-specific intercept, s(t) is an exogenous annual seasonal profile function that satisfies a particular periodicity condition (e.g., weekly), $\alpha_{i,j}$ are promotional sensitivities with respect to price changes by location, and $\beta$ is a long-run sensitivity to price. In this example, a linear mixed-effects approach may be used, with location specific parameters used as fixed chain-level parameters with random location-specific deviation. The ARDL model 1102 may generate estimated elasticities at an item adpatch-district level, which may be separated into chain-level fixed effects plus adpatch-district level random deviations. Accordingly, downstream modeling may utilize fixed effects for enterprisewide forecasting, and may use combinations of fixed effects and random deviation effects (e.g. alpha and beta) at more granular levels.

The elasticity estimation model 1104 may receive, in the example shown, outputs from the ARDL model 1102, including pre-promotional sales, all weekly sales, and SKU promo statistics, as well as new item data, new item coefficient estimates, and any estimate carryover, to generate the fixed effects, random effects, and amplified random effects (e.g., the beta, alpha, and amplified alpha outputs) that are output to elasticity tables 1002.

In an example implementation, the elasticity estimation model 1104 may utilize a model of the form:

$$\log(y(t+J)) = \mu(t) + \eta(t)s(t+h) + \beta\ \log(BasePrice) + h(t+h) + \alpha_{promotype}(\log(PromoPrice) - \log(BasePrice))$$

In this equation, the $\mu(t) + \eta(t)s(t+h) + \beta\ \log(BasePrice) + h(t+h)$ term may be recharacterized as:

$$\log(ActualSales) = \log(BaseSales) + \alpha_{promotype}(\log(PromoPrice) - \log(BasePrice))$$

$$\log(ActualSales) - \log(BaseSales) = \alpha_{promotype}(\log(PromoPrice) - \log(BasePrice))$$

Additionally, $\alpha_{promotype} \in \{\alpha_{tpc\_pbo}, \alpha_{circ\_pbo}, \alpha_{tpc\_bsgs}, \alpha_{circ\_bsgs}, \alpha_{tpc\_gc}, \alpha_{circ\_gc}\}$ corresponds to the price elasticities to be estimated for each item at each adpatch-district.

A mixed-effects model may then be fitted for each other type of promotion. Those weeks during which a promotion is in placed will be used as training data for such a model.

In the example shown, a model training scheduler 1110 may be incorporated into the overall elasticity model 1100 as well. The model training scheduler 1110 may be implemented, for example using a scheduler 701 of FIG. 7, to perform retraining tasks with respect to the various models and sub models incorporated within the elasticity model 1100. In examples, the model training scheduler 1110 may be configured for weekly retraining. However, daily retraining processes may also be performed, to the extent needed for improved accuracy and based on data availability.

FIG. 12 illustrates a dataset 1200 that includes clusters of locations that operate similarly regarding sales of an item or group of items, and which may be used in a price insights model 1008, such as seen in FIG. 10. In particular, the dataset 1200 represents an example in which outputs from an elasticity model 818 may be provided to downstream modeling processes. As seen here, a clustering process may generate clusters of numbers of locations of a particular item or item group, as well as a number of sales units, sales dollars, repeat guest factors, and cluster characteristics (e.g., how well-define the clusters may be). Additionally, a mean elasticity for each cluster may be calculated from the item or items. This mean elasticity may be generated from the beta output of the elasticity model 818, and may represent an average elasticity across a set of items for a given location or set of locations (e.g., an adpatch-district, or the like).

In further examples, and referring to FIGS. 10-12, the elasticity components, and techniques for creation of reusable models similar thereto, may be used in the context of an enterprise-wide demand and/or sales estimation modeling process utilizing a Gaussian Additive Mixture Model (GAMM) as noted above. In doing so, a base sale estimation may be created that estimates a base sale in a similar process to the promotional model described herein. Depending on whether a location or chain mode is used, sales may need to be aggregated and/or disaggregated to an appropriate level for downstream model consumption, Furthermore, in the context of elasticity, data used in training such models may be augmented by calculating a separate promotional price for each offer type, and integrating stacked promotions into such a promotional pricing analysis. Furthermore, an offer type elasticity estimation may be calculated on an offer-type-specific basis.

IV. Disaggregation Model Components

Referring now to FIGS. 13-17, further details regarding an additional modular modeling structure are provided. In this example, models useable to provide aggregation and disaggregation of model forecasts to varying levels of granularity are provided, and may represent a possible implementation of the aggregation and disaggregation component 816 of FIG. 8.

In particular, for a sales forecast for a given item i at a location l at a start time to and duration z, a sales probability function (SPF) may be defined, using a probability mass function of sales N from t to z, and using a probability distribution, such as a Poisson distribution. Such a probability distribution may be defined at a desired disaggregation level using a discrete cumulative distribution function, as well as an instantaneous sales intensity, which defines an expectation value of the N sales at a particular time for an item and location over a duration as noted above (e.g., a point forecast).

In this construction, the cumulative distribution function may be described as:

$$F_N = P(N \leq n) = \Sigma_{k \leq n} f_N(k)$$

Additionally, the instantaneous sales intensity may be described as:

$$I_{ifr}(t) \equiv E[N](t) = \sum_{n=1}^{\infty} n f(n)$$

In particular examples, at an item-location-day level, data for a given item may be low count, and have high noise. As such, estimating an underlying rate of sales may be difficult as to either an individual location or an individual day, and the noise may make an accurate regression difficult. By aggregating item sales to a level where data is not too sparse, effective models may be created. This may include aggregation over a number of vectors, including locations (e.g., from an individual location to a group of locations, or to a chain wide forecast at a given period of time), time, or collections of items. While aggregation over locations allows for higher precision at a specific time, aggregation over time allows for improved location-level precision. Aggregation across items to common item types, for example, improves ability to forecast new items that may fall within a collection of similar items. Subsequent disaggregation models may be deployed to obtain forecasts at greater levels of granularity In some examples described herein, forecasting models may be implemented using a relational neural network (RNN) or mixed effects model; such models may be trained on various sales data, and generate forecasts at the item-chain-week level. In the context of the present disclosure, any of a variety of selectable models may be used to disaggregate such forecasts from a chain level to a location level, and may be selected on the basis of accuracy or computational intensity, or some combination thereof. Specific modeling approaches and modular disaggregation models are provided.

Figure 13:
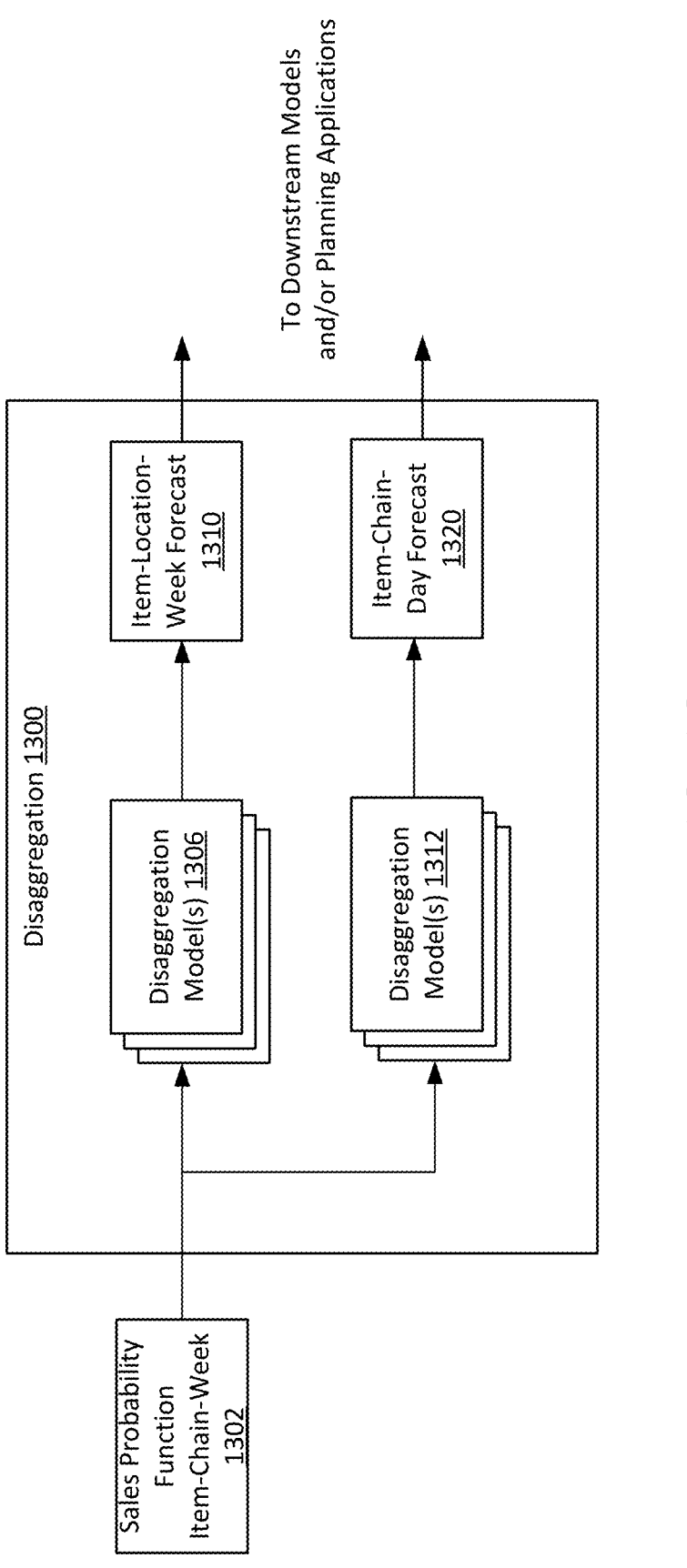
FIG. 13 is a block diagram of an example disaggregation module and related models that are useable within the context of the enterprise data science infrastructure described herein.

Referring specifically to FIG. 13, an example disaggregation modeling architecture is depicted, in an example embodiment. In the example shown, the disaggregation modeling architecture includes a disaggregation modeling component 1300 that may be utilized within a demand forecasting architecture as described herein. In the example shown, the disaggregation modeling component 1300 receives forecast sales for a given item, for example at a higher level of granularity than desired. In the example shown, the forecast sales 1302 are received at an item-chain-week level. A desired forecast may be associated with a particular location within an overall enterprise chain of retail locations, or may be associated with a particular day within the week. Other time or location granularity's may be used as well.

In the example shown, the received forecast sales 1302 may be provided to different collections of disaggregation models within the disaggregation modeling component 1300. For disaggregations from a chain level to a location level, a first set of disaggregation models 1306 may be used to arrive at an item-location-week forecast 1310, with a particular model selected from that collection. For disaggregations from a week level to a day level, a second set of disaggregation models 1312 may be used, to arrive at an item-chain-day forecast 1320, with a particular model selected from that collection.

The first set of disaggregation models 1306 may include a variety of models selected based on complexity and/or accuracy. Example models can include any of the following.

An equal allocation model in which a forecast for each location is equal to an average sales per location across all locations. Such an equal allocation model may be used in isolated circumstances, such as for new location forecasts or carryforward items.

A sales history model may use a fractional contribution of each individual location aggregated over a sufficiently long period (e.g. one prior year of sales data) in which every location has seen some sales of the item.

A department or class level sales history model may be used in circumstances where new items are to be sold at individual locations where other, similar items were previously sold.

A seasonal sales history model may be used, with disaggregation estimates for location-item combinations adjusted based on a seasonality that is out of phase with a national trend (e.g., sales of winter clothing in warm climate locations, and the like).

A negative binomial/gamma distribution model that utilizes a combination of ensemble distributions and a value of the input aggregate forecast to determine disaggregate forecasts for individual locations. Such a model may further require use of a variance calculation, as described in further detail below in conjunction with FIG. 14.

In scenarios where a sales history model is used within the set of models described above, it is sometimes the case that local seasonal variation may not be adequately captured (e.g. in the case of swimwear). To address this issue, in some instances an item recency factor may be calculated at the item location level contribution to chain level sales. This location level contribution is derived from a same time in the prior year at a higher item aggregation level (e.g. department, class, category, etc.). That is, localized seasonality is accounted for at an item aggregate level and reintroduced at the item specific level. Similar methods may be performed for new items or new locations carrying an item.

The second set of disaggregation models 1312 may include a variety of models also selected based on complexity and/or accuracy. Example models can include any of the following:

A default daily sales percentage (DSP) applied to each day during the week based on historical sales weighting of each day.

A daily sales percentage for each department or class averaged over time.

An item level daily sales percentage averaged over time (e.g., usable more readily for high volume items).

A department/week or class/week level daily sales percentage, with optional adjustments for holidays that move among different weeks on a year-to-year basis.

An item-week level daily sales percentage (usable more readily for high volume items with less likelihood of data sparsity and/or noise).

Figure 14:
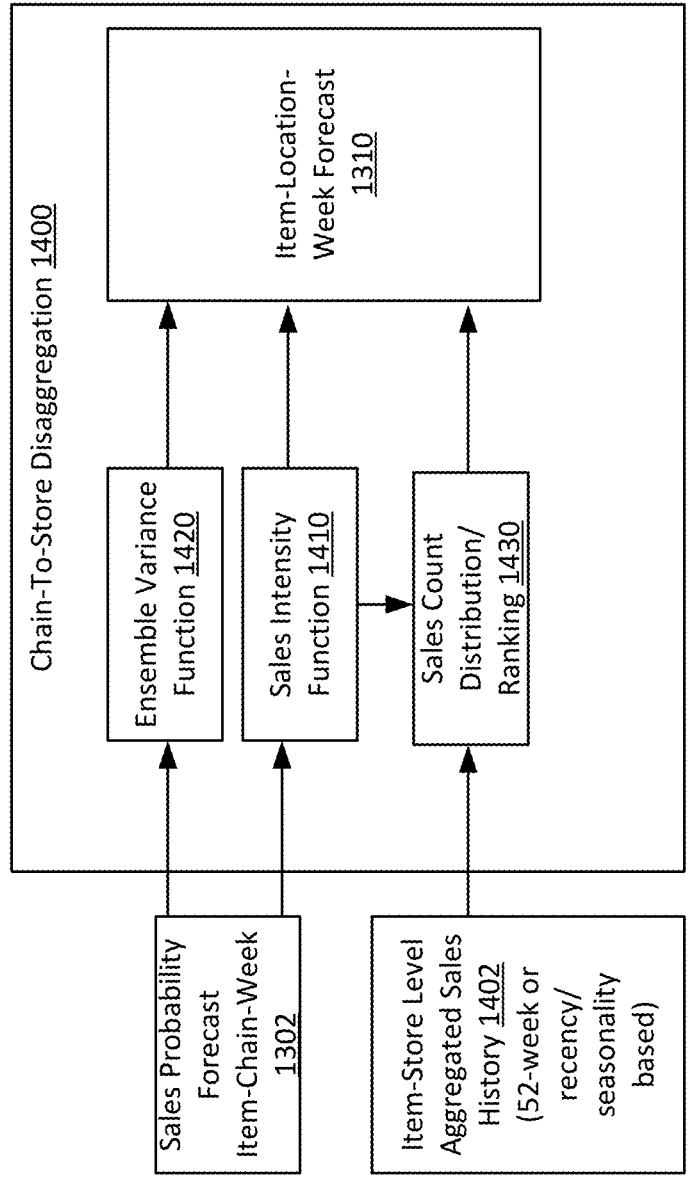
FIG. 14 is a block diagram of an example disaggregation model operable within the context of FIG. 13.

Referring to FIG. 14, a particular disaggregation model 1400 is provided that might be used within the disaggregation modeling component 1300 of FIG. 13. Generally speaking, the disaggregation model 1400 may be implemented using the negative binomial/gamma distribution model approach mentioned above.

In the example shown, the sales forecast data 1302 for which a disaggregation is sought may be provided to a sales intensity function (SIF) 1410, as well as an ensemble variance function 1420. Additionally, sales history aggregated at the item-location level 1402, may be provided to a sales count distribution ranking algorithm 1430. The sales intensity function 1410, ensemble variance function 1420, and sales count distribution ranking algorithm 1430 are each used in generating the disaggregated item location week forecast 1310.

In the example shown, the sales intensity function 1410 represents a distribution of expected values for average sales per unit time among all locations at which an item is sold. In particular, a number of locations N per sales intensity interval for a given item is generated, and may be used to determine a relative sales performance of each location for a given item. The sales intensity function 1410 is generally fit by a gamma distribution, presuming a sufficient number of locations are associated with selling the particular item.

In an example, the sales intensity function 1410 may be defined as follows:

$$\bar{I}_{i\ell\tau m}(t) = \frac{\sum_{k=1}^{m} I_{i\ell\tau}(t - k\tau)}{m}$$

In this example, $\bar{I}_{i\ell\tau m}(t)$ represents an average sales intensity over period r, for m periods (e.g., days or weeks). As such a time-averaged location sales intensity function may correspond to the following:

$$\text{SIF} dI = \mathcal{N}(I) dI$$

Generally speaking, instantaneous sales intensities for a given item at a particular location and a day cannot be directly measured, because discrete counts are generally too small for accurate approximation. However, with sufficient numbers that the gamma distribution represents a reasonable description of sales intensity, an average of sales intensities across all locations may be described as follows:

$$\langle I \rangle = \frac{\int_I I \, \text{SIF} \, dI}{\int_I \text{SIF} \, dI}$$

The ensemble average may then be approximated by a sum of individual intensities divided by the number of locations m where the item is within the assortment and in stock:

$$\langle \hat{I} \rangle_{i\tau m} = \frac{\sum_{\ell} \hat{I}_{i\ell\tau m}(t)}{\mathcal{N}_{asmt,i}}$$

The ensemble variance function 1420 provides a relationship between the ensemble mean and variance, for the aggregation over the plurality of locations. In some examples, the ensemble variance function 1420 may be used in estimation of the sales count distribution ranking when only an ensemble mean (average sales per location) is available. In examples, the ensemble variance function 1420 is well fit by a power-law or broken power-law. In particular, if ensemble variance cannot be directly measured or forecast, an empirical relationship between the ensemble mean and variance may be used as follows:

$$\langle (\Delta N)^2 \rangle = \eta \langle N \rangle^\alpha$$

In this, variance $\langle (\Delta N)^2 \rangle$ may be derived from the mean N and parameters $\eta$ and $\alpha$, which are determined from historical data and differ by item (with some slight effects for seasonality).

The sales count distribution ranking algorithm 1430 may receive item-location level aggregated sales history data 1402, and generates a distribution of the discrete sales counts per unit time across all locations at which the item is sold. In examples, the sales count distribution may be well fit by a negative binomial distribution, and can be directly measured and fit on historical data or estimated from ensemble parameters including a mean $\langle N \rangle$ and a variance $\langle (\Delta N)^2 \rangle$.

In some instances, the data 1402 may correspond to 52 weeks of historical data for ranking of sales counts among locations. However, in some instances, to improve accounting for recency and seasonality effects, an item-location level 4-week aggregated sales history (For recency) and a department-location level average in the 3 week time period during the prior year may also be used (or may be used in place of the 52-week data) for generating the sales count distribution ranking. As noted below, incorporation of recency data and seasonality data, at the location level, may improve disaggregation by location.

Generally speaking, because the number of locations at which an item is sold may change over time, aggregation of a sum of sales may provide an inaccurate representation of aggregated location sales count distribution. Furthermore, outliers may significantly bias the results of such a distribution. As such, a probability mass function may be used, and underlying distributions estimated. In some examples, the sales, distribution may be estimated from an ensemble mean and variance.

The disaggregation model 1400 utilizes the above algorithms by calculating a set of gamma distribution parameters for an instantaneous sales intensity function, as follows:

$$\hat{\theta} = \frac{\langle (\Delta N)^2 \rangle - \langle N \rangle}{\langle N \rangle}$$

$$\hat{k} = \frac{\langle N \rangle^2}{\langle (\Delta N)^2 \rangle - \langle N \rangle}$$

This gamma distribution may then be plotted to determine the appropriate disaggregation for a particular location. In particular, an instantaneous sales intensity function across all locations, combined with a known rank order of each location's performance derived from the sales count distribution ranking algorithm 1430 may provide an instantaneous sales intensity for a particular location. The instantaneous sales intensity function may be generated using the sales intensity function 1410 combined with the ensemble variance function 1420 to arrive at the instantaneous sales intensities described above. As such, an enterprise level or chain level forecast may be disaggregated down to a location level using a forecasted ensemble mean, an ensemble variance obtained from a direct forecast or from an ensemble various function model and best fit parameters, as well as a relative sales efficiency rank of each location.

In some examples, the disaggregated location level data may be re-aggregated, for example into groups of locations as needed. In such circumstances, the re-aggregated group of locations forecasts may be represented as a Gaussian distribution derived from a some of counts obtained from plus on distributions associated with each location with a rate equal to a sum of individual rates. Such a re-aggregation process may be incorporated into a disaggregation module overall, and may be provided as a service to other model components within the overall architecture based on a requested level of disaggregation by those other, external components.

Additionally, in some examples, a new location may be added, or may newly carry a particular item. In this instance, the location may not have reliable sales history. Accordingly, an override feature may be used, in which a new location forecast may be based on a multiplier of a model location (e.g., a store determined to be similar). Model location information may be generated as needed, with multipliers generated periodically, e.g., on a weekly basis. In some instances, a future new store, or store that is just recently open, may use the same forecast as a model store, while a store that has been open for some period if time (e.g., from 6-52 weeks) may use a recent 4 weeks of sales history (localized recency information) in combination with the model store forecast.

Figure 15:
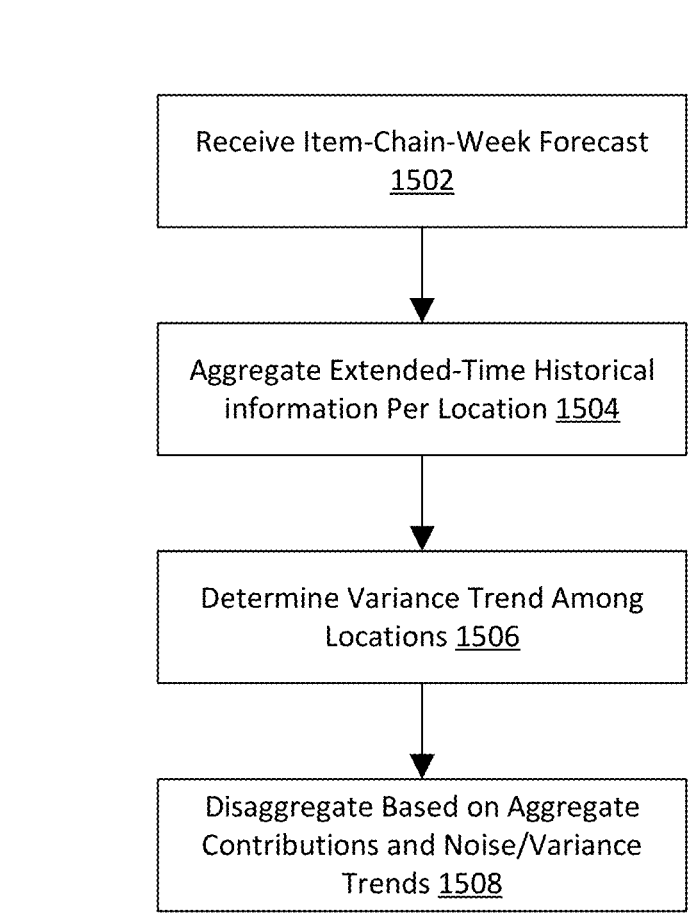
FIG. 15 is a flowchart of an example location-based disaggregation process, in accordance with an example embodiment.

FIG. 15 illustrates a flowchart of a method 1500 of performing location-level disaggregation using one or more of the models described previously in conjunction with FIGS. 13-14. In the example shown, the method 1500 includes receiving an aggregate forecast (step 1502). The aggregate forecast may be aggregate over a number of locations, such as across an entire chain of retail locations, for a given item. The method 1500 further includes aggregating an extended time history of performance on a per location basis (step 1504) for a given item.

In the example shown, the method 1500 includes determining a variance trend among each of the locations (step 1506), for example based on the extended time history information. The aggregated, extended time historical information may also provide for a mean forecast usable as described above. The method 1500 may also include disaggregation of the received forecast, for example based on contributions to the aggregate from each location, as well as noise or variance trends (step 1508). The disaggregation of the received forecast may be performed using a selected model. In the example where aggregate or mean information is used in combination with variance information, the disaggregation approach described above in conjunction with FIG. 14 may be used.

Figure 16:
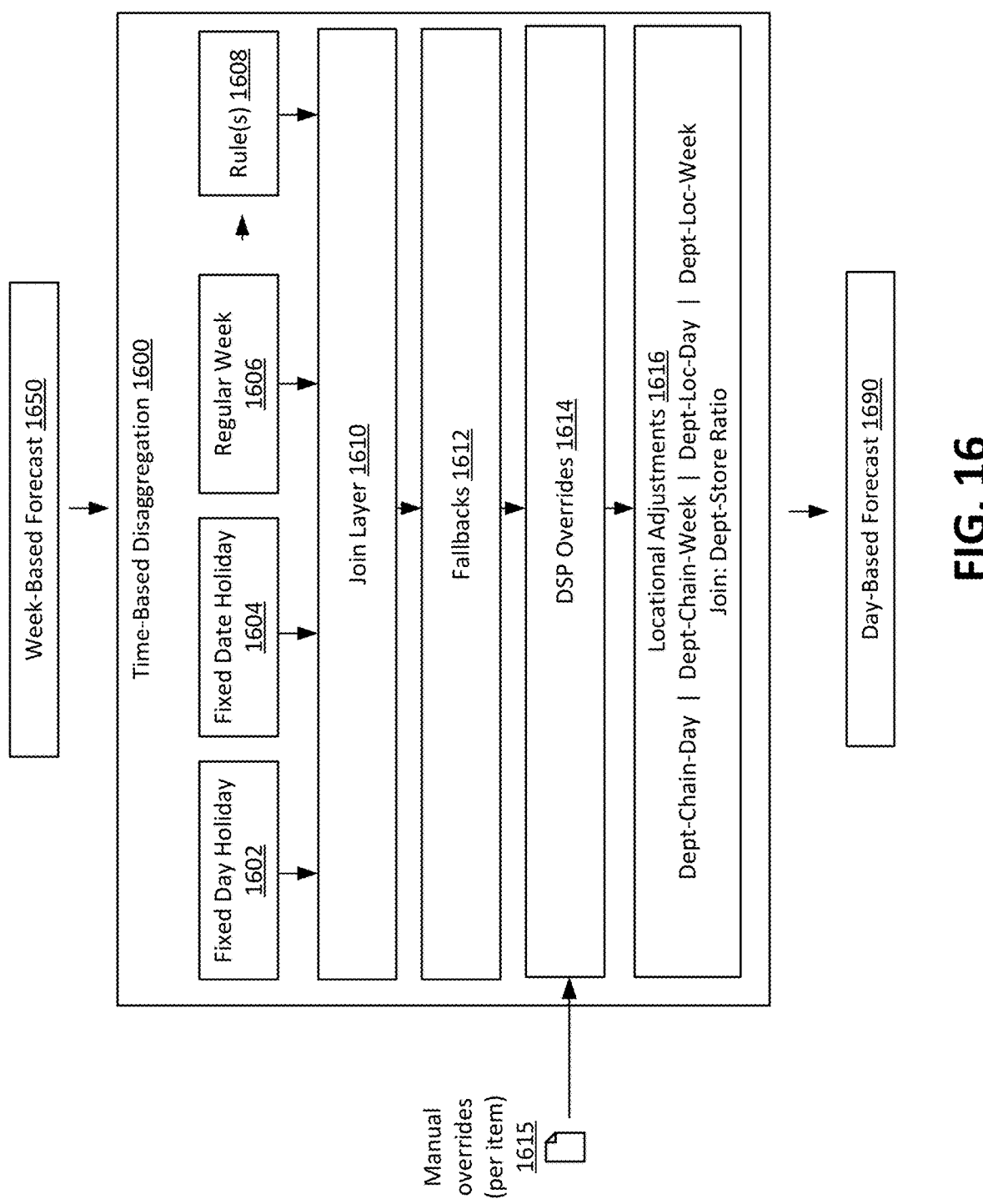
FIG. 16 is a block diagram of an example time-based disaggregation model, operable within the context of FIG. 13.

Referring now to FIG. 16, an example block diagram of an example time-based disaggregation framework 1600 is provided. The framework 1600 may be used, for example, in the context of the disaggregation modeling component 1300 of FIG. 13.

Generally speaking, time-based disaggregation includes creation of a daily sales percentage (DSP) table. The DSP table corresponds to a seven-day array that contains a daily fraction or percentage of weekly sales. In example embodiments, the DSP table corresponds to store demand specifically (excluding online demand). A set of daily sales percentage overrides may be applied in individualized cases. Such overrides may be received from a planning team as a separate file and may define specific override values for individualized days. Additionally, a locational adjustment table is created. The locational adjustment table is used to adjust the daily sales percentage on a per location basis. The locational adjustment table may include adjustments at a department level.

In the example shown, a week-based forecast 1650 is received at the framework 1600. The week-based forecast 1650 may correspond, for example, to the item-chain-week forecast 1302 of FIG. 13; it may also correspond to an item-location-week forecast that is to be disaggregated to a daily forecast at the particular location.

The framework 1600 determines whether the week-based forecast 1650 is associated with a fixed day holiday 1602, a fixed date holiday 1604, or a regular week 1606. The framework 1600 further determines, based on the type of week, one or more rules to be applied as to how a daily sales percentage is calculated. Such rules are provided in further detail below in conjunction with the method 1700 of FIG. 17.

In the example shown, the framework 1600 includes a join layer 1610. The join layer 1610 obtains a default daily sales percentage from a predetermined location. The daily sales percentage may be stored in a table and retrieved based on the calculation corresponding to historical data defining the identified week and week type. At this stage, a daily sales percentage table for 52 weeks for each item identifier is generated. A set of fallback logic, shown as fallbacks 1612, fills in any gaps in data missing for particular item aggregations and weeks. Next, a set of daily sales percentage overrides are applied by and overrides layer 1614. The overrides layer 1614 receives manual overrides, for example via an override file 1615, and replaces values within the DSP table with selected manual values.

Additionally, a set of locational adjustments 1616 may be applied. The locational adjustments may be made on a department specific basis, and may be either specific to a location and week, or may be specific to a day but may be applied across an enterprise chain. Such locational adjustments may be joined to arrive at a department-store ratio, which may in turn be applied to adjust, for particular departments, the daily sales percentages on a department specific basis and for particular locations (e.g., stores). Accordingly, a day-based forecasts 1690 may be generated that accounts for not only unique weak characteristics due to holidays, but also incorporates additional data where data sparsity is a problem, receives manual overrides where needed, and customizes to individual locations and departments where such departments operate or perform differently than a location or chain overall on a daily basis. Such a day-based forecast 1690 may be returned in response to a request from another modeling component or planning component within an enterprise, for example as described above in conjunction with FIG. 13, and in the context of the overall enterprise modeling process described herein.

Figure 17:
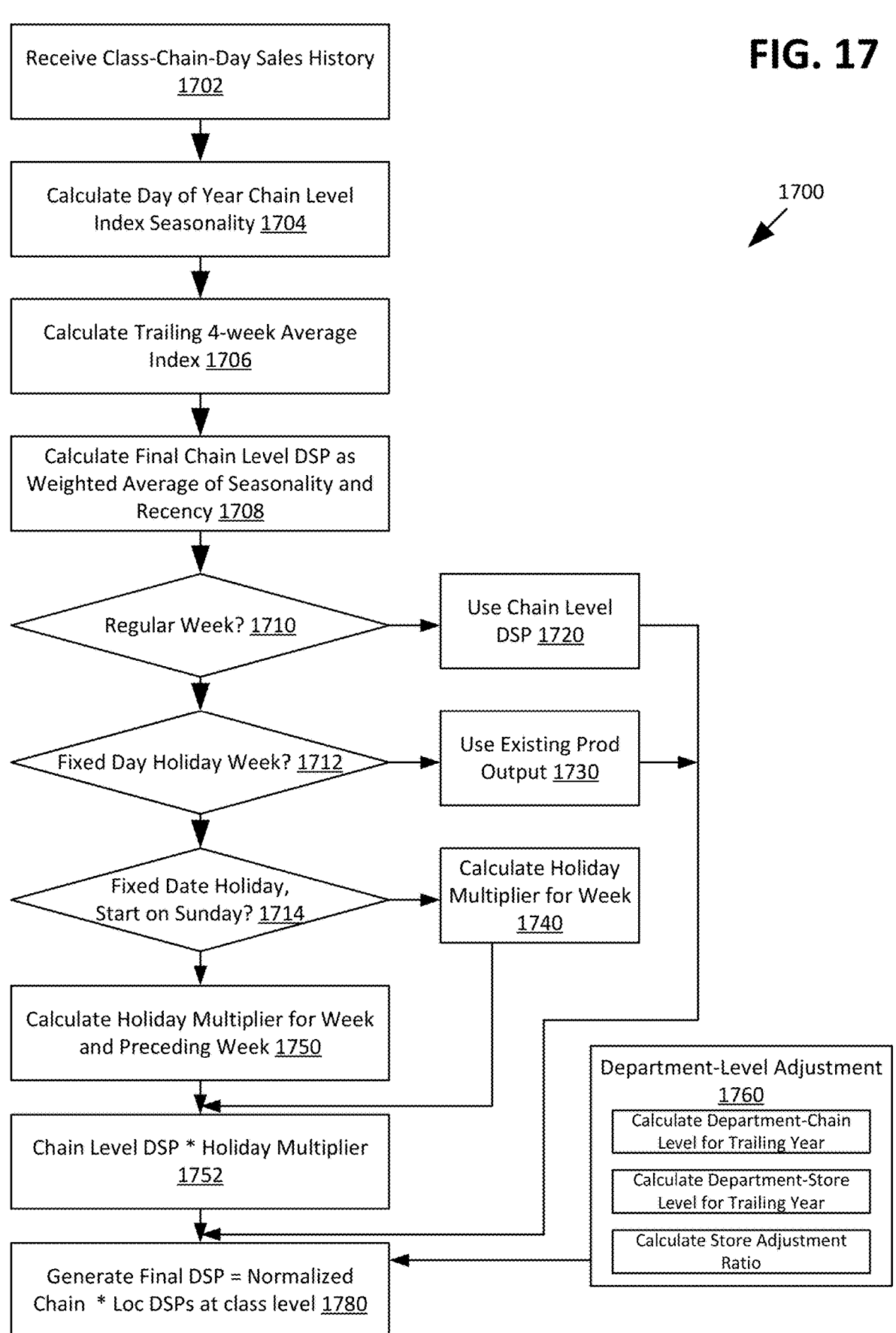
FIG. 17 is a flowchart of an example time-based disaggregation process, in accordance with an example embodiment.

Referring now to FIG. 17, a method 1700 of performing time-based disaggregation of an aggregate forecast is provided. The disaggregation process illustrated here may be performed by one or more of the models 1312 described above, for example to disaggregate weekly forecasts for an item to achieve daily forecasts, and may utilize the framework 1600 of FIG. 16.

As illustrated, the method 1700 includes receiving sales history information across an entire class and chain of locations on a time disaggregated basis (e.g., daily) (step 1702). The method 1700 further includes calculating seasonality as a chain level index across every day of the year (step 1704).

In the example shown, the method 1700 further includes calculating a recency index, for example by calculating an average index of sales over the past short period of time (e.g., four weeks) at a class level (step 1706). Additionally, chain level daily sales percentages may be calculated as a weighted average of the seasonality and recency calculations of steps 1704 and 1706 (step 1708).

In some examples, individual day effects may then be determined. For example, a first determination of whether the week is a regular week lacking holidays is performed, at operation 1710. A second determination of whether the week is a fixed day holiday week (e.g., Thanksgiving week) is performed, at operation 1712. A third determination of whether the fixed date holiday week (e.g., Christmas) and starts on a Sunday is performed, at operation 1714. If the week is a regular week, the chain level daily sales percentage may be used (step 1720), which was calculated in step 1708. If the week is a fixed day holiday week, the existing output may be used for the fixed day (step 1730). If the week is a fixed date holiday week a holiday multiplier may be applied for the fixed date holiday week days (step 1740). If that week starts on a Sunday, the week including the holiday and the prior week may have the holiday multiplier applied to each day (at step 1750). For holiday week date weeks, a chain level daily sales percentage is adjusted by the holiday multiplier (at step 1752). Finally, a final daily sales percentage is determined for each day based on the normalized chain as adjusted by the localized daily sales percentage at a class level (step 1780).

In some embodiments, a department level adjustment process may be applied (step 1760). The department level adjustment process may include, for example, calculating a department-chain (enterprisewide) level for the preceding year, as well as a department-location level for the preceding year. A location (e.g., store) adjustment ratio may then be calculated based on the associated levels. Both the department-chain level and department-location level may be calculated utilizing a recency factor, for example a weighted average of the trailing three months, in combination with the prior nine months of activity, to determine department level adjustments. The department level adjustment process may be used to further modify the final daily sales percentage for each given location, such that each department may have a different sales percentage effect. The calculated daily sales percentages may subsequently be used for disaggregation from weekly to daily sales, as needed by downstream planning systems.

Referring to method 1700 generally, it is noted that inclusion of a recency calculation, in combination with seasonality and sales history information to generate a daily sales percentage on a weighted basis between seasonality and recency allows for improved disaggregation of weekly sales to account for daily effects. In particular, overall daily sales forecasts have been determined to improve in accuracy for a given item by about 2-3% on a per-store basis. That is, for 1000 stores, incorporation of recency data improves the disaggregation forecast in some way on a daily basis for 20-30 stores. Similar results are seen across various categories of items, with a range of improvements between 8.1% to negligible percentages in increased/decreased performance depending on the item.

As seen generally in the various methods of disaggregation, as well as the elasticity analyses described above, a desired sales forecast may readily be generated using a combination of models and model components that may be used in varying orders or sequences to arrive at a desired forecast given a business use case. For example, a baseline forecast may be affected by a planned promotion, and may require adjustment using particular elasticity parameters generated by an elasticity modeling component. Still further, baseline models may generate forecasts that require adjustment by a separable seasonality component. Additionally, where models may, by default, generate weekly forecasts for items at an enterprisewide level, for various planning purposes (e.g., supply chain logistics, shipping, etc.) such forecasts may require disaggregation to a location level for accurate decision-making by the enterprise. As such, the architecture described herein may allow for selectively utilizing a disaggregation model selected and tuned to the particular disaggregation process required. Still further, various models may be used in parallel, or independently of each other, and parameters, such as elasticity, disaggregated demand, and the like, may be stored and retrieved by other models for consumption and use in other forecasting or business decision-making processes.

V. Example Computing Execution and Environment

Referring to FIGS. 1-17 generally, it is noted that the modular components and distributed computing systems may be implemented on various computing hardware; typically, enterprise-scale computing infrastructure will be required to train and execute models to achieve the various business objectives to which the models may be applied. In example embodiments, as noted above, a collection of pipelines may be used, for example built on Hadoop and using Spark for data execution. Such an arrangement may be tuned well to enterprise scale storage and access of distributed data, and may provide fault tolerance and load balancing features. This may be required, because in general, a set of workflows are performed to generate item-store-week forecasts, and independently, item-chain-week forecasts. The item-chain-week forecasts may be disaggregated, using the disaggregation techniques described herein, to validate the store-level forecasts. Additionally, in some implementations, two passes may be performed: a first pass estimates a model using records associated with the sale of a single item, with the model fitted to sales at all stores in a given district and random effects used to account for store variations, and a second pass in which models are fitted to data for sales of item styles within a district. Each of the passes, and different modeling granularities, may be resolved subsequently.

In some further implementations, individualized models may be refreshed independently of each other. That is, application of a new promotion to an existing forecast for an item at a store or within a chain of stores may only require application of the promotion effects model, without requiring recalculation of the underlying demand if that has otherwise gone unchanged. Storage of model outputs, with individual models executed within containerized images executing on an enterprise computing architecture (e.g., as illustrated in FIG. 7) including a plurality of computing systems as described below. In this arrangement, requests for model estimation may be received and managed at an input interface, and model estimations updated based on a scheduler action (e.g., on a particular periodicity, or optionally based on prioritization).

Figure 18:
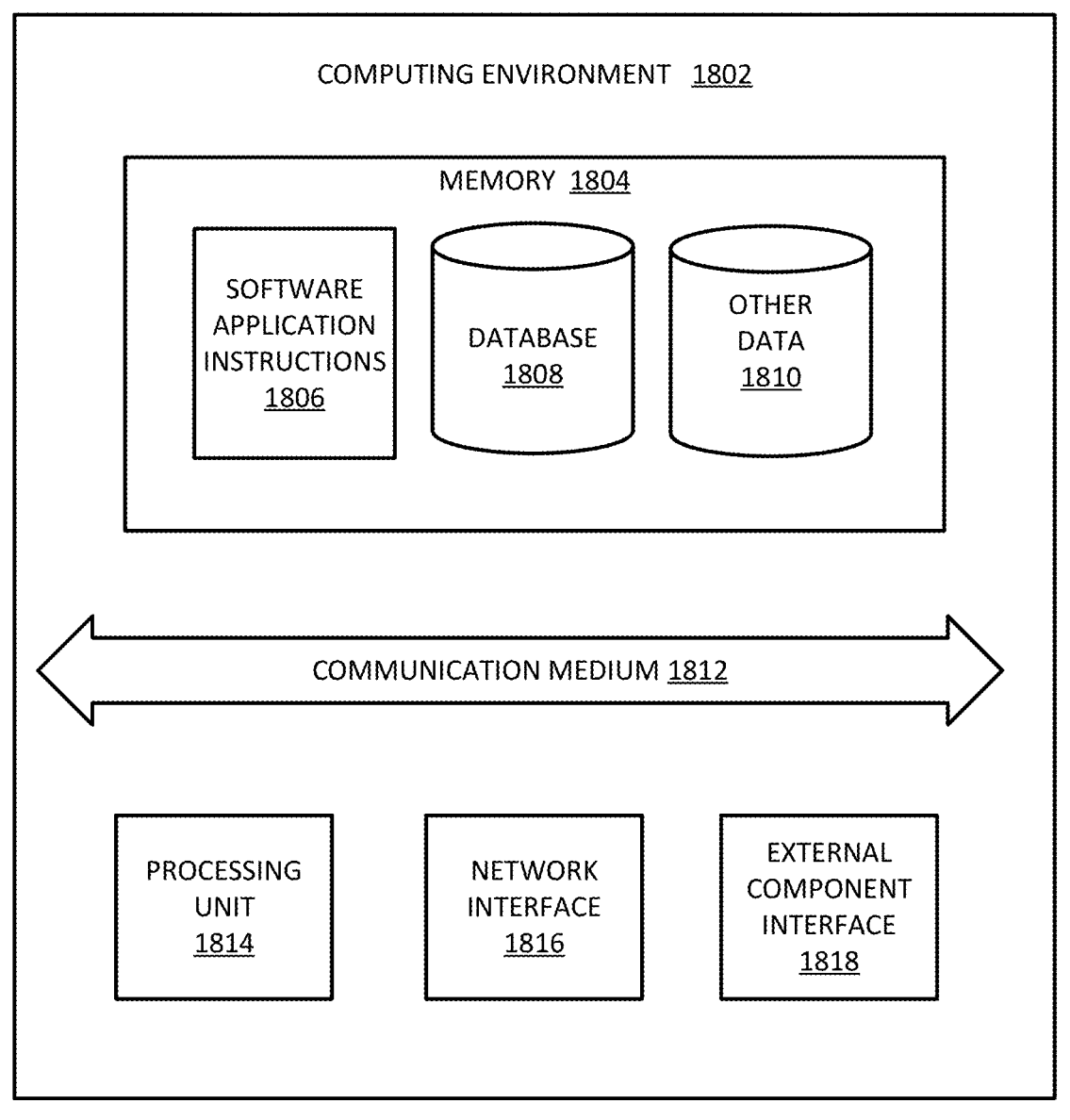
FIG. 18 is a block diagram of a computing system with which aspects of the present disclosure may be implemented.

FIG. 18 illustrates an example system 1800 with which disclosed systems and methods can be used. In an example, the following can be implemented in one or more systems 1800 or in one or more systems having one or more components of system 1800: the enterprise data science infrastructure 220, computing devices used by the enterprise data scientists 230, the devices 208, 210, and/or any other computing systems disclosed herein.

In an example, the system 1800 can include a computing environment 1802. The computing environment 1802 can be a physical computing environment, a virtualized computing environment, or a combination thereof. The computing environment 1002 can include memory 1804, a communication medium 1812, one or more processing units 1814, a network interface 1816, and an external component interface 1818.

The memory 1804 can include a computer readable storage medium. The computer storage medium can be a device or article of manufacture that stores data and/or computer-executable instructions. The memory 1804 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1804 can store various types of data and software. For example, as illustrated, the memory 1804 includes software application instructions 1806, one or more databases 1808, as well as other data 1810.

The communication medium 1812 can facilitate communication among the components of the computing environment 1802. In an example, the communication medium 1812 can facilitate communication among the memory 1804, the one or more processing units 1814, the network interface 1816, and the external component interface 1818. The communications medium 1812 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1814 can include physical or virtual units that selectively execute software instructions, such as the software application instructions 1806. In an example, the one or more processing units 1814 can be physical products comprising one or more integrated circuits. The one or more processing units 1814 can be implemented as one or more processing cores. In another example, one or more processing units 1814 are implemented as one or more separate microprocessors. In yet another example embodiment, the one or more processing units 1814 can include an application-specific integrated circuit (ASIC) that provides specific functionality. In yet another example, the one or more processing units 1814 provide specific functionality by using an ASIC and by executing computer-executable instructions.

The network interface 1816 enables the computing environment 1802 to send and receive data from a communication network (e.g., the network 214). The network interface 1816 can be implemented as an Ethernet interface, a token-ring network interface, a fiber optic network interface, a wireless network interface (e.g., Wi-Fi), or another type of network interface.

The external component interface 1818 enables the computing environment 1802 to communicate with external devices. For example, the external component interface 1818 can be a USB interface, Thunderbolt interface, a Lightning interface, a serial port interface, a parallel port interface, a PS/2 interface, or another type of interface that enables the computing environment 1802 to communicate with external devices. In various embodiments, the external component interface 1818 enables the computing environment 1802 to communicate with various external components, such as external storage devices, input devices, speakers, modems, media player docks, other computing devices, scanners, digital cameras, and fingerprint readers.

Although illustrated as being components of a single computing environment 1802, the components of the computing environment 1802 can be spread across multiple computing environments 1802. For example, one or more of instructions or data stored on the memory 1804 may be stored partially or entirely in a separate computing environment 1800 that is accessed over a network.

Depending on the size and scale of the computing environment 1802, it may be advantageous to include one or more load balancers to balance traffic across multiple physical or virtual machine nodes.

Aspects of the platform 1800 and the computing environment 1802 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others' permissions on their objects (e.g., actions).

Each node may be configured to be capable of running the full platform 1800, such that portal can run and schedule jobs and serve the portal user interface as long as a single node remains functional. The environment 1802 may include monitoring technology to determine when a node is not functioning so an appropriate action can be taken.

Referring to FIGS. 1-17 overall, the architecture and arrangement of data science models as described herein has a number of advantages, particularly within a retail environment. That is, given the wide variety of types of models employed by a large scale retail organization, a flexible, consistent, extensible architecture for using component models to achieve a wide variety of business goals significantly reduces storage resources for disparate models and disparate data sets used by those models, while improving consistency across models and comparability of results. Additionally, usage of component models that have coordinated source data and training schedules provides further consistency across models and improves their explain ability and combined ability, and therefore reuse, within a data science organization. However, rather than try to generate a unified demand signal that is applicable at all levels of granularity (which typically results in significant inaccuracy at either high or low levels of granularity—e.g., by location, item, or time), a flexible model building architecture is provided in which components of such a structure may be modularly interrelated to arrive at the desired forecasts for particular items or item types (e.g., fast-selling items, slow selling items, new items, etc.) at particular locations (a specific store, region, or chain-wide) for a desired timeframe and in the context of a specific price or promotional scheme.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A platform for creation, maintenance, and execution of machine learning models within a retail organization having a plurality of locations including retail locations and warehouse locations, the platform comprising:

one or more computing systems each including one or more processors and a memory, the memory storing instructions that cause the one or more computing system to perform:

building, at a feature build layer, a plurality of features usable in generating a plurality of interoperable machine learning demand forecasting model components;

determining, at a feature quality validation component, a quality of (1) each data source of a plurality of disparate data sources and (2) features derived from the plurality of disparate data sources;

hosting the plurality of interoperable machine learning demand forecasting model components including at least a base forecasting model component, an item lifecycle forecasting model component, an item similarity service, a store similarity service, and a demand transfer component, the plurality of interoperable machine learning demand forecasting model components being trained using a normalized dataset derived from the plurality of disparate data sources to output a prediction of an effect on demand isolated by the respective one of the plurality of interoperable machine learning demand forecasting model components;

creating a plurality of machine learning models from the machine learning demand forecasting model components, the plurality of machine learning models being useable for demand forecasting within a retail organization, the plurality of machine learning models each outputting a demand forecast at a different granularity and including at least:

a first forecasting model created from a first set of model components selected from the machine learning demand forecasting model components and executable within one or more nodes of a containerized environment to forecast demand at a per-item, per-day, per location level within the retail organization, and a second forecasting model created from a second set of model components selected from the machine learning demand forecasting model components different from the first set, the second forecasting model being executable within one or more nodes of the containerized environment to forecast demand at a department-week-store sales level;

wherein the first forecasting model and the second forecasting model have an overlapping set of model components within the first set of model components and the second set of model components to maintain time-based synchronization between the first forecasting model and the second forecasting model;

automatically adjusting, by an automated attribute addition component and an automated attribute removal component, data attributes used by at least one machine learning model of the plurality of machine learning models;

backfilling, by a lookback window backfill component, missing data from at least one machine learning model of the plurality of machine learning models using past data in a configurable-sized lookback window;

automatically scheduling execution of the plurality of machine learning models independently of each other within the platform within a plurality of distributed container-based executable modules; and scheduling an automated retraining cadence for each of the plurality of machine learning models via a model training scheduler.

2. The platform of claim 1, wherein each of the plurality of machine learning models is formed from two or more of the plurality of interoperable machine learning demand forecasting model components.

3. The platform of claim 1, further comprising updating at least one of the plurality of machine learning models by including a reactive modeling component that is executable to adjust demand in response to external events.

4. The platform of claim 1, wherein the plurality of machine learning models includes a third forecasting model useable to forecast demand at a per-item, per-week, per chain level within the retail organization.

5. The platform of claim 1, wherein the second forecasting model includes a sub-model based, at least in part, on external event data.

6. The platform of claim 5, wherein the first forecasting model does not use at least some of the external event data and/or the sub-model used by the second forecasting model.

7. The platform of claim 1, wherein the second forecasting model is configured to receive one or more user inputs, and wherein the first forecasting model is entirely automated.

8. The platform of claim 1, wherein the first forecasting model and the second forecasting model execute without communicating with each other.

9. The platform of claim 1, wherein the first forecasting model and the second forecasting model comprise hierarchical models.

10. The platform of claim 1, further comprising a resource manager used to manage platform computing resources during execution of the plurality of machine learning models within the plurality of distributed container-based executable modules.

11. A method of managing a plurality of demand forecasting models within a retail enterprise, the method comprising:

ingesting and normalizing data from a plurality of disparate data sources including internal and external data sources;

building, at a feature build layer, a plurality of features usable in generating a plurality of interoperable machine learning demand forecasting model components;

determining, at a feature quality validation component, a quality of (1) each data source of the plurality of disparate data sources and (2) features derived from the plurality of disparate data sources;

hosting the plurality of interoperable machine learning demand forecasting model components including at least a base forecasting model component, an item lifecycle forecasting model component, an item similarity service, a store similarity service, and a demand transfer component, the plurality of interoperable machine learning demand forecasting model components being trained using the normalized data derived from the plurality of disparate data sources to output a prediction of an effect on demand isolated by the respective one of the plurality of interoperable machine learning demand forecasting model components;

creating a plurality of machine learning models from the machine learning demand forecasting model components, the plurality of machine learning models being useable for demand forecasting within a retail organization, the plurality of machine learning models each outputting a demand forecast at a different granularity and including at least:

a first forecasting model created from a first set of model components selected form the machine learning demand forecasting model components and executable within one or more nodes of a containerized environment to forecast demand at a per-item, per-day, per location level within the retail organization, and a second forecasting model created from a second set of model components selected from the machine learning demand forecasting model components different from the first set, the second forecasting model being executable within one or more nodes of a containerized environment to forecast demand at a department-week-store sales level;

wherein the first forecasting model and the second forecasting model have an overlapping set of model components within the first set of model components and the second set of model components to maintain time-based synchronization between the first forecasting model and the second forecasting model;

automatically adjusting, by an automated attribute addition component and an automated attribute removal component, data attributes used by at least one machine learning model of the plurality of machine learning models;

backfilling, by a lookback window backfill component, missing data from at least one machine learning model of the plurality of machine learning models using past data in a configurable-sized lookback window;

automatically scheduling execution of the plurality of machine learning models independently of each other within the platform; and scheduling an automated retraining cadence for each of the plurality of machine learning models via a model training scheduler.

12. The method of claim 11, wherein creating the plurality of machine leaning models includes creating each of the plurality of machine learning models from two or more of the plurality of interoperable machine learning demand forecasting model components.

13. The method of claim 11, further comprising executing the plurality of machine learning models within a plurality of distributed container-based executable modules.

14. The method of claim 11, wherein the first forecasting model and the second forecasting model execute without communicating with each other.

15. The method of claim 11, further comprising receiving one or more user inputs controlling the second forecasting model.

16. The method of claim 15, wherein the first forecasting model is entirely automated.

17. The method of claim 11, wherein the second forecasting model includes a sub-model based, at least in part, on external event data.

18. The method of claim 11, further comprising updating at least one of the plurality of machine learning models by including a reactive modeling component that is executable to adjust demand in response to external events.

19. The method of claim 11, wherein the first forecasting model does not use at least some of the external event data and/or the sub-model used by the second forecasting model.

20. The method of claim 11, wherein the first forecasting model and the second forecasting model comprise hierarchical models.

* * * * *